United States Patent
Alack, Jr. et al.

(10) Patent No.: US 10,572,088 B2
(45) Date of Patent: Feb. 25, 2020

(54) VEHICULAR COMPONENTS COMPRISING SENSORS

(71) Applicant: Tactual Labs Co., New York, NY (US)

(72) Inventors: Robert Joseph Alack, Jr., Austin, TX (US); Clifton Forlines, Cape Elizabeth, ME (US); Darren Leigh, Round Hill, VA (US); Braon Moseley, Round Rock, TX (US); Adam Landa, Forest City, FL (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/110,637

(22) Filed: Aug. 23, 2018

(65) Prior Publication Data

US 2018/0364840 A1    Dec. 20, 2018

Related U.S. Application Data

(63) Continuation-in-part of application No. 15/821,677, filed on Nov. 22, 2017, and a continuation-in-part of application No. 15/690,234, filed on Aug. 29, 2017, now Pat. No. 10,386,975, and a continuation-in-part of application No. 15/690,242, filed on Aug. 29, 2017.

(60) Provisional application No. 62/588,267, filed on Nov. 17, 2017, provisional application No. 62/488,753, filed on Apr. 22, 2017, provisional application No. 62/428,862, filed on Dec. 1, 2016, provisional application No. 62/381,314, filed on Aug. 30, 2016.

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2203/04104* (2013.01)

(58) Field of Classification Search
CPC .. A63F 13/212; A63F 13/214; A63F 13/2145; G06F 2203/04102; G06F 2203/04104; G06F 3/017; G06F 3/0416; G06F 3/0418; G06F 3/044
See application file for complete search history.

(56) References Cited

U.S. PATENT DOCUMENTS

| | | | | |
|---|---|---|---|---|
| 2008/0142713 | A1* | 6/2008 | Breed | B60N 2/002 250/330 |
| 2016/0001728 | A1* | 1/2016 | Schrabler | B60R 21/01534 342/28 |
| 2016/0069714 | A1* | 3/2016 | Scheuing | G01D 3/08 702/104 |
| 2016/0075297 | A1* | 3/2016 | Lamesch | B60N 2/002 324/603 |
| 2017/0039835 | A1* | 2/2017 | Brankovic | B60N 2/002 |

(Continued)

*Primary Examiner* — Tony O Davis
(74) *Attorney, Agent, or Firm* — Adam B. Landa

(57) ABSTRACT

A sensor for use with vehicular components. The sensors may comprise transmitting and receiving antennas that can be interleaved or placed within the various materials throughout the vehicle so that interaction with the materials will provide information related to the use. Sensors may also infuse signal into an occupant within the vehicle via the material which can provide enhanced interactions with various vehicle features and components.

20 Claims, 20 Drawing Sheets

(56) References Cited

U.S. PATENT DOCUMENTS

2017/0150929 A1\* 6/2017 Sankai .................... A61B 5/026
2018/0345894 A1\* 12/2018 Althaus .................. B60N 2/002
2018/0370473 A1\* 12/2018 Lamesch .............. B60N 2/5685
2018/0370475 A1\* 12/2018 Holzapfel ............ H03K 17/955

\* cited by examiner

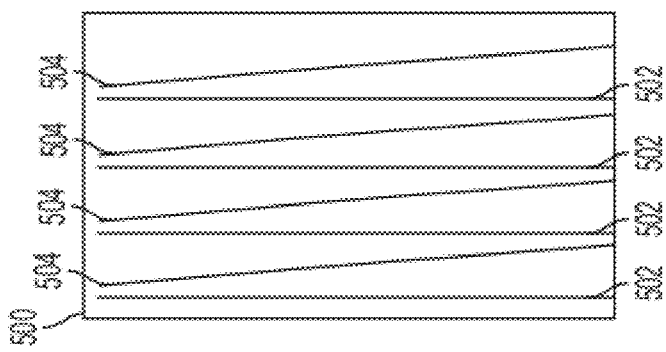
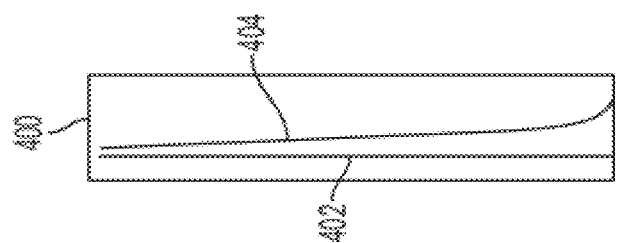
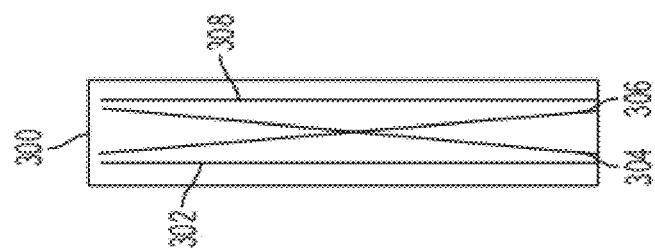
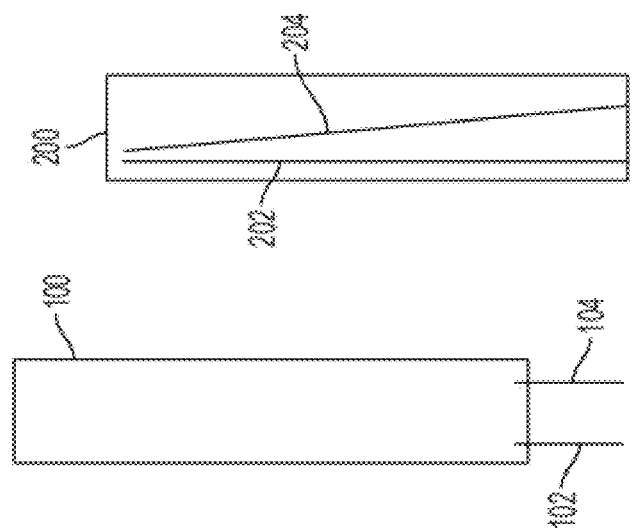
FIG. 5
FIG. 4
FIG. 3
FIG. 2
FIG. 1

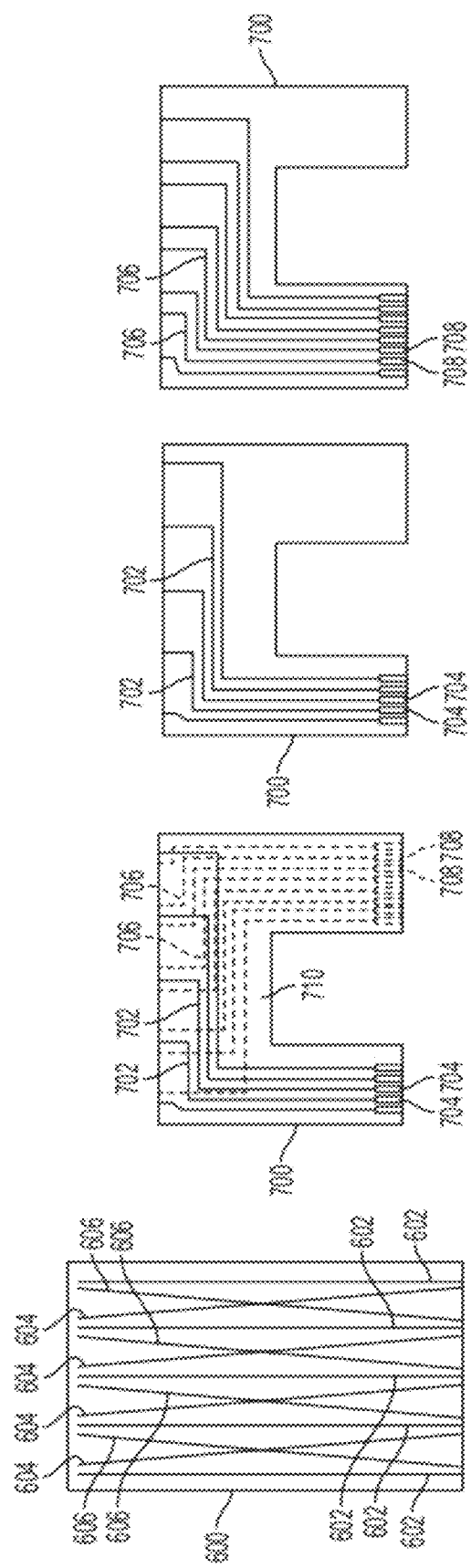

VEHICULAR COMPONENTS COMPRISING SENSORS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The disclosed systems and methods relate in general to the field of sensing, and in particular vehicular components comprising sensors.

BACKGROUND OF THE INVENTION

Touch sensitive devices are popular as input devices to various computing systems and other devices due to their ease of use and versatility. A touch sensitive device generally includes a touch surface which may, in various applications, be a clear translucent or opaque. In many applications (e.g., smart phones, smart watches, touch-screen tv and touch-screen monitors) a clear touch surface includes a display device that enables a touch interface which, through appropriate software and hardware, allows a user to interact with the display. In other applications (e.g., touch pads) the touch surface does not include a display device that is viewed therethrough. Many methods and apparatuses are known for measuring the touch deltas (e.g., the measurable change (i.e., response) resulting from a touch) and from those measurements, determining the location of one or more touches, see, e.g., U.S. Pat. No. 9,019,224 entitled "Low Latency Touch Sensitive Device" and U.S. Pat. No. 9,529,476 entitled "Fast Multi-Touch Post-Processing" the disclosures of which are incorporated herein by this reference. Touch delta may be expressed as a ratio in dB. Generally, the touch delta directly affects the signal to noise (SNR) for the system. In a typical capacitive touch sensor design, high touch deltas are desirable at the touch surface of the sensor. Generally, a touch delta would reflect a difference between a baseline response of a touch sensor and its response with a touch object (such as a finger or stylus) present. In the context of the above-identified patents, a touch delta would reflect a difference between a baseline response of a touch sensor at each given frequency and its response at those frequencies with a touch object (such as a finger or stylus) present.

Portions of a touch sensor—which may be conductive materials such as ITO or silver nano-wire—are embedded in, placed on, or integrated with a touch surface (such portions of a touch sensor may be referred to herein as e.g., touch sensor conductors, conductive elements or touch sensor antennas). Touch sensor conductors are typically placed in a grid of rows and columns, either the rows or columns may be stimulated with signals or energy, although in some embodiments, both the rows and columns are stimulated. In a typical touch application, spacing between the rows and spacing between the columns is generally uniform, and is often proposed in the range of 4 mm to 5 mm.

As used herein, driven conductors are sometimes referred to as drive lines, and the other are referred to as sense lines. (In some touch sensors, the touch sensor conductors may act as drive lines and sense lines at the same time, see, e.g., U.S. Pat. No. 9,811,214 entitled "Fast Multi-Touch Noise Reduction" the disclosure of which is incorporated herein by this reference. Touch surfaces such as those described above include an array of touch regions or nodes formed at the crossing points between rows of drive lines and columns of sense lines. To sense touch on the touch surface, drive lines are stimulated causing them to capacitively couple with the crossing sense lines. Receivers measure the coupled signals on the crossing sense lines. In some implementations, coupled signals from nodes proximate to a touch decrease on the sense lines, and vice versa. It should be noted that the word touch as it is used herein does not require physical touch (e.g., actual contact), but only a nearing sufficient to create a measurable touch delta. In general, a touch sensitive device detects the position of touch deltas caused by a touch (i.e., a touch event) by correlating the receivers detecting the touch delta with a row-column position.

Although the rows and columns are identified as "crossing", the crossing as used in that context is as observed from a plan view. In general, the rows and columns do not touch, rather, they are in close proximity with each other and thus, can be capacitively coupled. In some implementations, the rows and columns are on separate layers. In some implementations, the rows and columns are on separate sides of a substrate. The rows and columns can be placed on the same layer, but can be bridged at each "crossing," requiring a large number of such bridges. As an example, typical spacing between the touch sensor conductors is between about 4 mm and 5 mm. Thus, on a typical smart-phone, there may be 20-30 rows and 10-20 columns, requiring between 200 and 600 bridges depending on the phone size and inter-conductor pitch.

In many instances, shielding may be required to separate row conductors from column conductors as they are being routed from the touch surface to, e.g., the drive circuit and sense circuit. In the case of generally rectangular touch surface, the rows (e.g., drive lines) must be routed from an edge that is at 90-degrees with respect to the edge from where the columns (e.g. sense lines) are routed. In view of the modern trend to reduce bezel size, attaching the rows and columns to the drive and sense circuits may require careful shielding and/or difficult or circuitous routing.

Row-column configurations discussed above, and in the referenced prior art, are easily etched or disposed on flat flexible surfaces and then applied to a surface. For flat surfaces, this works well, however, the use of flat-manufactured sensors on compound curves or on complex surfaces may cause a variety of issues including stretching and bunching, and may lead to breakage of conductors during e.g., a wrapping operation.

There is a need for a touch sensor that addresses these shortcomings and provides other benefits.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

FIG. 1 shows a high-level illustration of an embodiment of a slide sensor.

FIG. 2 shows a schematic illustration of an embodiment of a slide sensor.

FIG. 3 shows a schematic illustration of another embodiment of a slide sensor.

FIG. 4 shows a schematic illustration of yet another embodiment of a slide sensor.

FIG. 5 shows a schematic illustration of one embodiment of a sensor for detecting touch.

FIG. 6 shows a schematic illustration of another embodiment of a sensor for detecting touch.

FIG. 7A shows an example of a connector, (showing one layer in phantom) that may be employed in in connection with the sensor for detecting touch illustrated in FIG. 6.

FIGS. 7B and 7C show a front and rear view of the connector illustrated in FIG. 7A.

DETAILED DESCRIPTION

Figure 9:
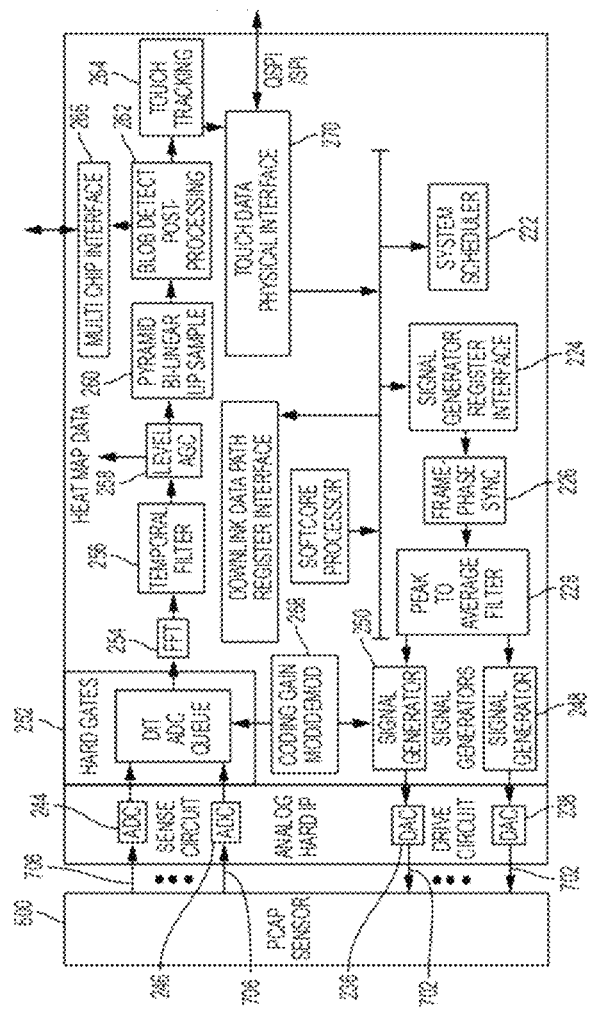
FIG. 9 shows a functional block diagram of an illustrative frequency division modulated touch sensitive device.

The present application contemplates various embodiments of touch sensors designed for human-computer or human-machine interaction applications. The present application also contemplates various configurations and orientations of touch sensor conductors to sense human-computer or human-machine interaction when combined with touch sensing apparatuses. While the touch sensor conductor configurations are suited to use with frequency-orthogonal signaling techniques (see, e.g., U.S. Pat. Nos. 9,019,224 and 9,529,476, and 9,811,214, all of which are hereby incorporated herein by reference), it may be used with other signal techniques including scanning or time division techniques, and/or code division techniques. It is pertinent to note that the sensors described and illustrated herein are also suitable for use in connection with signal infusion (a/k/a signal injection) techniques and apparatus.

The presently disclosed systems and methods involve principles related to and for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, touches are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

Throughout this disclosure, the terms "touch", "touches", "touch event", "contact", "contacts", "hover", or "hovers", "gesture", "pose" or other descriptors may be used to describe events or periods of time in which a user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the terms "hover", "gesture" or "pose" the sensor may be tuned to allow for the detection of "touch events" that are at a distance above the touch surface or otherwise separated from the sensor device and causes a recognizable change, despite the fact that the conductive or capacitive object, e.g., a stylus or pen, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact", "hover", "pose" and "gesture" each of which is a touch or touch event. Generally, as used herein, the word "hover" refers to non-contact touch events or touch, and as used herein the terms "hover", "pose" and gesture" are types of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "gesture", "pose", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

Certain principles of a fast multi-touch (FMT) sensor have been disclosed in patent applications discussed above. In an embodiment, orthogonal signals are transmitted into a plurality of drive conductors, and the information received by receivers attached to a plurality of sense conductors is analyzed by a signal processor to identify touch events. Drive and sense conductors (also sometimes called rows and columns, transmitters and receivers) may be organized in a variety of configurations, including, e.g., a matrix where the crossing points form nodes, and touch interactions are detected at those nodes by processing of the column or sense signals. In an embodiment where the orthogonal signals are frequency orthogonal, spacing between the orthogonal frequencies, $\Delta f$, is at least the reciprocal of the measurement period $\tau$, the measurement period T being equal to the period during which the columns are sampled. Thus, in an embodiment, a column may be measured for one millisecond ($\tau$) using frequency spacing ($\Delta f$) of one kilohertz (i.e., $\Delta f=1/\tau$).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that, the term orthogonal as used herein is not "violated" by such small contributions. In other words, as we use the term frequency orthogonal herein, two signals are considered frequency orthogonal if substantially all of the contribution one signal made to the DFT bins is made to appear different than substantially all of the contribution of the other signals.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and achieve 1 kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event. Generally, as the term is used herein, injection or infusion refers to the process of transmitting signals to the body of a user, effectively allowing the body (or parts of the body) to become an active transmitting source of the signal. In an embodiment, an electrical signal is infused into the hand (or other part of the body) and this signal can be detected by a sensor even when the hand (or fingers or other part of the body) are not in direct contact with the sensor's touch surface. To some degree, this allows the proximity and orientation of the hand (or finger or some other body part) to be determined, relative to a surface. In an embodiment, signals are carried (e.g., conducted) by the body, and depending on the frequencies involved, may be carried near the surface or below the surface as well. In an embodiment, frequencies of at least the KHz range may be used in frequency injection. In an embodiment, frequencies in the MHz range may be used in frequency injection. To use infusion in connection with FMT as described above, in an embodiment, an infusion signal can be selected to be orthogonal to the drive signals, and thus it can be seen in addition to the other signals on the sense lines.

In various embodiments, the present disclosure is directed to systems (e.g., objects, controllers, panels or keyboards) sensitive to hover, contact, pressure, gestures and body posturing and their applications in real-world, artificial reality, virtual reality and augmented reality settings. It will be understood by one of ordinary skill in the art that the disclosures herein apply generally to all types of systems using fast multi-touch to detect hover, contact, pressure, gestures and body posturing.

The term "controller" as used herein is intended to refer to a physical object that provides the function of human-machine interface. In an embodiment, the controller may be handlebars of a vehicle, such as a motorcycle. In an embodiment, the controller may be the steering wheel of vehicle, such as car or boat. In an embodiment, the controller is able to detect the movements of a hand by sensing such movements directly. In an embodiment, the controller may be the interface used with a video game system. In an embodiment, the controller may provide the position of a hand. In an embodiment, the controller may provide pose, position and/or movement of other body parts through the determination of movement proximate to and/or associated with the body part and/or function, for example, the articulation of the bones, joints and muscles and how it translates into the position and/or movement of the hand or foot.

The devices and controllers discussed herein may use antennas that function as transmitters and receivers. However, it should be understood that whether the antennas are transmitters, receivers, or both depends on context and the embodiment. When used for transmitting, the conductor is operatively connected to a signal generator. When used for receiving, the conductor is operatively connected to a signal receiver. In an embodiment, the transmitters and receivers for all or any combination of the patterns are operatively connected to a single integrated circuit capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

The purpose of the transmitters and receivers discussed herein are to detect touch events, movements, motions, and gestures, such as hover, proximity, hand position, gestures, poses, etc. with 3D positional fidelity. The transmitted signals can be transmitted in a particular direction. In an embodiment a mixed signal integrated circuit is used. The mixed signal integrated circuit comprises a signal generator, transmitter, receiver and signal processor. In an embodiment, the mixed signal integrated circuit is adapted to generate one or more signals and transmit the signals. In an embodiment, the mixed signal integrated circuit is adapted to generate a plurality of frequency orthogonal signals and send the plurality of frequency orthogonal signals to the transmitters. In an embodiment, the frequency orthogonal signals are in the range from DC up to about 2.5 GHz. In an embodiment, the frequency orthogonal signals are in the range from DC up to about 1.6 MHz. In an embodiment, the frequency orthogonal signals are in the range from 50 KHz to 200 KHz. The frequency spacing between the frequency orthogonal signals is typically greater than or equal to the reciprocal of an integration period (i.e., the sampling period). In an embodiment, the frequency of the signal is not changed and the amplitude of the signal is modulated instead.

The principles discussed above are used in addition to other features of the signal transmission in order to obtain meaningful information regarding positions, gestures, motions, postures, touch events, etc. of various body parts. In an embodiment, the system and methods disclosed herein use various properties of the transmitted signals in order to process this information to provide accurate depictions of hand positions and gestures.

Slide Sensors

FIG. 1 shows a high-level illustration of an embodiment of a slide sensor 100 made in accordance with the present disclosure. Slide sensor 100 comprises at least two touch sensor conductors 102, 104, one to act as a drive line and the other to act as a sense line. While the sensor conductors 102 and 104 are described as a drive line and a sense line at times herein, the sensor conductors 102 and 104 may also be referred to as a transmitter and a receiver, a transmitter conductor and a receiver conductor, or a transmitting antenna and a receiving antenna. It should be understood that the particular terminology usage may vary depending upon the application being discussed.

In an embodiment, touch sensor conductor 102 is employed as a drive line, and touch sensor conductor 104 is used as a sense line. In an embodiment, the reverse holds, and touch sensor conductor 102 is employed as a sense line, while touch sensor conductor 104 is used as a drive line. Regardless of that orientation, to operate the slide sensor 100, drive circuitry (not shown) generates a drive signal to stimulate the drive line, and a sensing circuit (not shown) senses a capacitively coupled response. A baseline response is sensed (by definition) when no touch is present on the surface of slide sensor 100. (As discussed above, the term touch, as used herein, does not require contact, but rather, refers to contact and near touches that affect the capacitive coupling between a drive line and a sense line.) When a touch occurs, a touch delta can be identified. In other words, when the touch occurs the capacitive coupling between a drive line and a sense line changes. In an embodiment, the touch delta is positive. In an embodiment, the touch delta is negative.

The touch delta of the slide sensor 100 differs depending on the location along the slide sensor 100 (i.e., from and away from the location where the touch sensor conductors are visible) of the touch object, i.e., the object affecting the capacitive coupling between the drive line and the sense line. (As used herein, the term touch object will be used to refer to the object affecting the capacitive coupling between the drive line and the sense line.) In an embodiment, the magnitude of the touch delta is different when a touch object is at one end of the slide sensor than it is when the same touch object is at the other end of the slide sensor. In an embodiment, the magnitude of the touch delta is greater when the touch object is at one end of the slide sensor and lower when it is at the other end of the slide sensor. In an embodiment, the magnitude of the touch delta changes from a high or maximum when the touch object is at one end of the slide sensor and a minimum or low when the touch object is at the other end of the slide sensor 100. In an embodiment, the touch delta changes as a touch object slides along the slide sensor 100 lengthwise (e.g., towards and away from the touch sensor conductor connections shown in FIG. 1). In an embodiment, the touch delta changes in a predictable manner as a touch object slides along the slide sensor 100 lengthwise. In an embodiment, because the touch delta changes with lengthwise position, the magnitude of the touch delta can be used to infer position.

Although the slide sensor 100 is shown having two touch sensor conductors accessible for connection at one end (i.e., edge) of the unit, it should be noted that in an embodiment, such access points (e.g., points of connection for drive and sense circuitry) may be placed on opposite ends of the slide sensor 100. In an embodiment, the access points may be made at any location on the slide sensor 100, however, as will be apparent to one of skill in the art in view of this disclosure, in routing leads to or from the touch sensor conductors, care needs to be taken to ensure that the routing does not cause interference with the sensor signal (e.g., with the sensed response). In an embodiment, shielding is used to prevent interference due to the location or position of routed leads used to connect a touch sensor conductor to a point where it can be accessed.

The touch sensor conductor configurations disclosed herein can be produced using any technique to place the touch sensor conductors upon a front and/or back surface or within a substrate. Techniques familiar to those of skill in the art can be used to place, configure or orient the touch sensor conductors, including, e.g., etching, photo-lithography, chemical vapor deposition, physical vapor deposition, chemical-mechanical planarization, or oxidation, to name several of common methods. Many different substrates are suitable for supporting touch sensor conductors. In an embodiment, a rigid or flexible printed-circuit board is used to support the touch sensor conductors. In an embodiment, flexible plastics or other deformable substrates can be used to support the touch sensor conductors.

Moreover, in each of the touch sensor conductor configurations disclosed herein, one or more of the touch sensor conductors may be placed on opposing sides of the supporting substrate from one or more of the other touch sensor conductors. Thus, in an embodiment, both touch sensor conductors may be on one side of a substrate. Alternatively, in an embodiment, one or more touch sensor conductors may be on one side of a substrate, while one or more other touch sensor conductors is on the opposing side of the substrate. In another embodiment, one or more of the touch sensor conductors are on one side of a relatively thin substrate, and one or more of the other touch sensor conductors are on a separate substrate, the two substrates being stacked with the relatively thin substrate above the other substrate. Other configurations will be recognized by persons of skill in the art in view of this disclosure without departing from the spirit and scope of the description herein, which is only intended to be limited by the annexed claims.

FIG. 2 shows a schematic illustration of one embodiment of a slide sensor 200. In the illustration, touch sensor conductors 202, 204 are visible in the slide sensor 200. In the illustrated embodiment, the touch sensor conductors 202, 204 are not parallel to each other, but rather, are arranged in a manner that the relationship between them changes along the length of the slide sensor 200. In an embodiment, the touch sensor conductors 202, 204 are oriented such that any given linear position along the length of the slide sensor 200 (i.e., up and down on the illustrated figure) corresponds to a different distance between the touch sensor conductors 202, 204. In an embodiment, the touch sensor conductors 202, 204 are oriented such that any given linear position along the length of the slide sensor 200 corresponds to a different touch delta for a given touch object at that linear position. Although one touch sensor conductor 202 is shown as a straight line parallel to the lengthwise direction of the slide sensor 200, this orientation is not necessary or required. In an embodiment, touch sensor conductor 202 is not straight. In an embodiment, touch sensor conductor 202 is curved. In an embodiment, touch sensor conductor 202 is not oriented parallel to the lengthwise direction of the slide sensor 200. In an embodiment, the touch sensor conductors 202, 204 are oriented in a narrow "V" formation. In an embodiment, the touch sensor conductors 202, 204 are oriented in a narrow inverted "V" formation. In an embodiment both touch sensor conductors 202, 204 are curved, and are oriented such that any given linear position along the length of the slide sensor 200 corresponds to a different touch delta for a given touch object at that linear position.

In an embodiment, both touch sensor conductors 202, 204 are curved, and are oriented such that any given X, Y position on the touch surface of the slide sensor 200 corresponds to a different touch delta for a given touch object at that position. In an embodiment where both touch sensor conductors 202, 204 are curved, a first touch sensor conductor may be configured in a space-filling curve, (e.g., a Hilbert Curve) and another touch sensor is configured to have a continuously variable distance from the first curve along its length (e.g., starting very close, and ending further away). In an embodiment using two curved touch sensor conductors, a 1-dimensional measurement along the length of the first curve can be used to derive 2-dimensional measurements on the sensor. In an embodiment, the first curve could be any Peano curve. In an embodiment, the first curve could be a Gosper curve. In an embodiment, the first curve could be a Moore curve. In an embodiment, the first curve could be a Serpinski curve. It will be apparent to a person of skill in the art in view of this disclosure that with respect to a space-filling curve, there are convenient mathematics for moving between a 1-dimension position on the curve to a 2D position in the space that it is filling.

Although the slide sensor 200 is shown having two touch sensor conductors accessible for connection at one end (i.e., edge) of the unit, it should be noted that in an embodiment, such access points (e.g., points of connection for drive and sense circuitry) may be placed on opposite ends of the slide sensor 200. In an embodiment, the access points may be made at any location on the slide sensor 200, however, as will be apparent to one of skill in the art in view of this disclosure, in routing leads to or from the touch sensor conductors, care needs to be taken to ensure that the routing does not cause interference with the sensor signal (e.g., with the sensed response). In an embodiment, shielding is used to prevent interference due to the location or position of routed leads used to connect a touch sensor conductor to a point where it can be accessed.

It should be noted that sensing areas (and or substrates) may come in various shapes and sizes, thus, the "one edge" description may not apply as clearly to some cases. It will be apparent to one of skill in the art in view of this disclosure that due to the novel configuration of the sensors described herein, electrical access to the conductors can be made in substantially less than 180 degrees of a sensing area as measured from a centroid of the sensing area. This differs from a traditional row-column sensor that would require electrical access from almost an entire 180 degrees. In an embodiment, electrical access to the conductors can be made in less than 120 degrees of a sensing area as measured from a centroid of the sensing area. In an embodiment, electrical access to the conductors can be made in less than 90 degrees of a sensing area as measured from a centroid of the sensing area. In an embodiment, electrical access to the conductors can be made in less than 45 degrees of a sensing area as measured from a centroid of the sensing area.

FIG. 3 shows a schematic illustration of another embodiment of a slide sensor 300. Slide sensor 300 comprises a total of four touch sensor conductors 302, 304, 306, 308. In an embodiment, two of the four touch sensor conductors 302, 308 are used as drive lines while the other two 304, 306 are used as sense lines. The reverse is equally applicable. In an embodiment, a bridge is used to conductively separate the two crossing touch sensor conductors 304, 306 In an embodiment, the two crossing touch sensor conductors are on separate layers. In an embodiment, the two crossing touch sensor conductors are on the front and back of the same substrate. the two crossing touch sensor conductors are on separate substrates. The non-crossing touch sensor conductors 302, 308 may be, but need not be, on the same or different layers or on the same or different substrates. As discussed above, in an embodiment, the touch sensor conductors may be or include curves instead of being solely straight lines. In order to operate as part of a touch sensor, the touch sensor conductors are configured to permit drive or sense circuitry (not shown) to be attached thereto.

In the embodiment shown in FIG. 3, all of the touch sensor conductors can be accessed on a single edge of the slide sensor 300. This permits the slide sensor 300 to be used in applications providing very small bezel space on three of the four sides. Although the slide sensor 300 is shown having its touch sensor conductors accessible for connection at one end of the unit, it should be noted that in an embodiment, such access points (e.g., points of connection for drive and sense circuitry) may be placed on opposite ends of the slide sensor 300. In an embodiment, the access points may be made at any location on the slide sensor 300, however, as will be apparent to one of skill in the art in view of this disclosure, in routing leads to or from the touch sensor conductors, care needs to be taken to ensure that the routing does not cause interference with the sensor signal (e.g., with the sensed response).

In the illustrated embodiment, the non-crossing touch sensor conductors 302, 308 are parallel to each other, while the crossing touch sensor conductors 304, 306 are not. Through this configuration, and provided that the drive lines have orthogonal signals, the relationship between the non-crossing touch sensor conductors 302, 308 and the crossing touch sensor conductors 304, 306 changes along the length of the slide sensor 300. As discussed above, the signals can be orthogonal in time, frequency and/or code. In an embodiment, again employing orthogonal signals on multiple drive lines, the touch sensor conductors 302, 304, 306, 308 are oriented such that any given linear position along the length of the slide sensor 300 corresponds to a unique distance between each drive line and each sense line. In an embodiment, again employing orthogonal signals on multiple drive lines, the touch sensor conductors 302, 304, 306, 308 are oriented such that any given linear position along the length of the slide sensor 300 corresponds to a unique touch delta between each drive line and each sense line.

In an embodiment, the two drive lines are stimulated at separate times. In an embodiment, the two drive lines are stimulated at alternating times so that when one of the drive lines is being stimulated, the other is not, and vice versa. This permits the drive lines to use the same stimulation signal.

Although the non-crossing touch sensor conductors 302, 304 are shown as a straight line parallel to the lengthwise direction of the slide sensor 300, this orientation is not necessary or required. In an embodiment, one or more of the non-crossing touch sensor conductors 302, 308 are not straight. In an embodiment, touch sensor conductor one or more of the non-crossing touch sensor conductors 302, 308 are curved.

In an embodiment, only one of the non-crossing touch sensor conductors is required. In other words, in an embodiment, a slide sensor 300, operates with three touch sensor conductors 302, 304, 306. In an embodiment, only one of the crossing touch sensor conductors is required. In other words, in an embodiment, a slide sensor 300, operates with three touch sensor conductors 302, 304, 308. A three-touch sensor conductor slide sensor 300 may use one or two drive lines, and one or two sense lines.

Thus, as one of many examples of such a three-touch sensor conductor slide sensor 300, non-crossing touch sensor conductor 302 is used as a drive line, and crossing touch sensor conductors 304, 306 are used as sense lines. Distance between drive line and each sense line is inversely affected by movement up and down the sliding sensor 300. In such an embodiment, coupling between drive line and each sense line may be inversely affected by movement up and down the sliding sensor 300, that is, that when the coupling between drive line 302 and sense line 304 increases (e.g., when a touch object is lower on the illustration and thus touch sensor conductors 302, 304 are close together), coupling between drive line 302 and sense line 306 decreases (e.g., when a touch object is lower on the illustration and touch sensor conductors 302, 306 are farther apart).

As another illustration of a three-touch sensor conductor slide sensor 300, non-crossing touch sensor conductor 302 is used as a sense line, and crossing touch sensor conductors 304, 306 are used as drive lines. In such an embodiment, for a touch object location towards the bottom of the sliding sensor 300 (as oriented in the illustration) a larger touch delta would be expected to be seen on the sense line 302 for the stimulation signal on drive line 304 as compared to the stimulation signal on drive line 306.

As a further illustration of a three-touch sensor conductor slide sensor 300, non-crossing touch sensor conductors 302, 308 are used as sense lines, and crossing touch sensor conductor 304 is used as a drive line. In such an embodiment, for a touch object location towards the bottom of the sliding sensor 300 a larger touch delta would be expected to be seen on the sense line 302 as compared to what is seen on sense line 308 for the stimulation signal on drive line 304.

In an embodiment, sensor 300 is implemented such that at least crossing touch sensor conductors 304, 306 are not on the same layer or are conductively isolated by a bridge; two sense lines 302, 308 are positioned straight vertical on the left and right, and two drive lines 304, 306 positioned on the diagonals. In such an embodiment wherein non-crossing touch sensor conductors 302, 308 are sense lines and crossing touch sensor conductors 304, 306 are drive lines, and wherein two touch sensor conductors 302, 304 are on one layer, while the other two touch sensor conductors 306, 308 are on another layer, a single-sided-drive sensor in the form of a slider is configured such that:
  (i) when touched at its top,
  1) the touch delta on sense line 302 is greater with respect to drive line 306, and lower with respect to drive line 304;
  2) the touch delta on sense line 308 is lower with respect to drive line 306, and greater with respect to drive line 304;
  (ii) when touched at its middle,
  1) the touch delta on sense line 302 is about the same with respect to drive line 306 and drive line 304;
  2) the touch delta on sense line 308 is about the same with respect to drive line 306 and drive line 304;
  (iii) when touched at the bottom,
  1) the touch delta on sense line 302 is lower with respect to drive line 306, and greater with respect to drive line 304;
  2) the touch delta on sense line 308 is greater with respect to drive line 306, and lower with respect to drive line 304;
This result can be accessed from a single edge. More generally, the absolute touch delta of the two sense lines 302, 308 can be used by touch detection logic to determine how close a touch is from the right and left, and the difference in the deltas can be used to determine where the touch is on the vertical axis from bottom to top.

FIG. 4 shows a schematic illustration of yet another embodiment of a two-touch sensor conductor 402, 404 slide sensor 400. The embodiment illustrated in FIG. 4 is similar to the one illustrated in FIG. 2, however, one of the two touch sensor conductors 404 in slide sensor 400 is curved.

In an embodiment, a second order curve may be used. In an embodiment, a curve may be imparted to one or more of the touch sensor conductors 402, 404. In an embodiment, one or more of the touch sensor conductors 402, 404 are curved to affect the touch delta that is sensed on the sense line by the sensing circuitry (not shown). In an embodiment, the effect of a touch object is generally reduced with the square of the distance between the capacitively coupled touch sensor conductors. Thus, configuring touch sensor conductors such that their spacing is (or approximates) a second order curve may provide a more linear touch delta response as a touch object is moved along the length of the slide sensor 400. In an embodiment, one or more of the touch sensor conductors are curved so that the sensed signals are more linearly related to the position of touch. In an embodiment, one or more of the touch sensor conductors are curved to cause sensed signals to be linearly related to the position of touch.

Slide sensors 100, 200, 300 and 400 can be used in a horizontal series to provide X positioning. Turning to FIG. 5 an embodiment of a sensor for detecting touch is schematically illustrated. The sensor 500 comprises two groups of touch sensor conductors 502, 504. The two groups of touch sensor conductors 502, 504 are shown as straight lines, but as discussed above, may be curved, and indeed, may be curved to increase the linearity of response (e.g., touch delta) with respect to a drive line/sense line pair. In an embodiment, one of the two groups of touch sensor conductors 502, 504 is employed as drive lines, while the other group of touch sensor conductors 502, 504 is employed as sense lines.

In an embodiment, the vertical/diagonal pairs of touch sensor conductors shown in FIG. 5 may be configured, and behave, as described in connection with FIG. 2. In an embodiment, the vertical/diagonal/vertical triplets of touch sensor conductors shown in FIG. 5 may be configured, and behave, as described in connection with a three-touch sensor conductor embodiment described in connection with FIG. 3. It should be noted that the embodiment shown in FIG. 5 arbitrarily contains an even number of touch sensor conductors, but could equally well have an odd number of touch sensor conductors, e.g., having an additional vertical touch sensor conductor to the right of the last touch sensor conductor shown.

The configuration shown in FIG. 5, and variations on that configuration that will be apparent to one of skill in the art in view of this disclosure, can be used to sense both X and Y position across the touch sensor 500. In an embodiment, the spacing between the drive lines in sensors according to the present disclosure may, but need not, fall within the range of 4 mm to 5 mm. In an embodiment, the spacing between the drive lines in sensors according to the present disclosure may be closer than 4 mm. In an embodiment, the spacing between the drive lines in sensors according to the present disclosure may exceed 5 mm. Similarly, in an embodiment, the spacing between the sense lines in sensors according to the present disclosure may, but need not, fall within the range of 4 mm to 5 mm. In an embodiment, the spacing between the sense lines in sensors according to the present disclosure may be closer than 4 mm. In an embodiment, the spacing between the sense lines in sensors according to the present disclosure may exceed 5 mm.

Touch location in the vertical ("Y") direction (as shown in the illustration) are identified as discussed above. Touch location in the horizontal ("X") direction is detected as a horizontal shift occurs in a touch object. Consider, for example a finger proximate to the touch sensor 500 in the upper left corner, and moving horizontally toward the upper right corner: when in the upper left corner a given magnitude touch delta will be seen between the first pair of drive and sense lines (e.g., the leftmost illustrated conductor and the second-to-left illustrated conductor); as the finger moves to the right, the magnitude of that touch delta will decrease, as the magnitude of the touch delta on the next pair of drive and sense lines increases (e.g., between the third-to-left conductor and the fourth-from-the-left illustrated conductor). This will continue across the panel. The foregoing analysis ignores the additional information that can be gleaned from the interaction between the second and third conductors, and the fourth and fifth conductors. In an embodiment, these touch deltas would be weaker near the top of the panel, but nonetheless, can provide valuable information to be used in locating the touch object. In an embodiment, where drive lines are driven with orthogonal signals and sense circuitry can sense an amount of each orthogonal signal that is present on each sense line, it will be apparent to a person of skill in the art in view of this disclosure that the sensed information from touch sensor 500 is sufficient to compute an X and a Y location for a touch object despite the lack of any nodes (i.e., crossing points between drive lines and sense lines).

The configuration shown in FIG. 5, and variations on that configuration that will be apparent to one of skill in the art in view of this disclosure, can be provided with all of the connections to drive and sense circuitry on one edge, thus permitting use in designs with edge constraints on at least three sides. As will be discussed in more detail below, care must be taken to shield the off-touch sensor drive lines from the off-touch sensor sense lines so that one does not affect the other. In an embodiment, the connections for one group of touch sensor conductors 502 are provided on one edge, while the connections for the other group of touch sensor conductors 504 are provided on the other edge. Such a configuration may reduce or eliminate shielding requirements. Moreover, in an embodiment, such a configuration may be used to keep stimulating circuits physically separate from sensing circuits.

FIG. 6 show a schematic illustration of another embodiment of a sensor for detecting touch. Sensor 600, like sensor 500, comprises two groups of touch sensor conductors 602, 604, like 502, 504. The embodiment illustrated in FIG. 6 differs from the FIG. 5 embodiment in that it additionally contains a third group of touch sensor conductors 606. In an embodiment, crossing conductors 604, 606 of sensor 600 are on separate layers (which may be on opposite sides of, or on and/or within the same substrate, or which may be on and/or within two separate substrates). In an embodiment (see FIG. 8), crossing conductors 804, 806 of sensor 800 are on the same layer, but separated by a bridge. (In an embodiment, the crossing conductors 804, 806 are made from ITO (indium tin oxide) and ITO bridges are used to separate the crossing conductors 804, 806 where they cross.

Turning back to FIG. 6, at least one of the three groups of touch sensor conductors 602, 604, 608 is used as drive lines, and at least one of the three groups of touch sensor conductors is used as sense lines; the third group of touch sensor conductors in touch sensor 600 can be either drive or sense lines.

In an embodiment, both groups of crossing touch sensor conductors 804, 806 are employed as sense lines, and the group of non-crossing touch sensor conductors are employed as drive lines. In an embodiment, both groups of crossing touch sensor conductors 804, 806 are employed as drive lines, and the group of non-crossing touch sensor conductors are employed as sense lines. In an embodiment, one group of crossing touch sensor conductors 804 is employed as sense lines, and the group of non-crossing touch sensor conductors and the other group of crossing touch sensor conductor are employed as drive lines. In an embodiment, one group of crossing touch sensor conductors 804 is employed as drive lines, and the group of non-crossing touch sensor conductors and the other group of crossing touch sensor conductor are employed as sense lines. Regardless of the selection of drive and sense lines, the techniques as described above can resolve X and Y coordinates of a touch object. In an embodiment, the sense circuitry receives sufficient information from the sense lines to resolve X and Y coordinates of multiple touch objects.

In an embodiment, the allocation of drive line and sense line is dynamic, and changes over time. Thus, for example, referring to the three groups of touch sensor conductors as A, B and C, and using the "prime" designation (e.g., A') to show the drive lines, in an embodiment, for a first scan or frame, the groups are A', B C, for a second scan or frame, the groups are A, B', C, and for a third scan or frame, the groups are A, B, C'—in an embodiment, this sequence is repeated. In another embodiment, for a first scan or frame, the groups are A', B' C, for a second scan or frame, the groups are A, B', C', and for a third scan or frame, the groups are A', B, C'. Again, in an embodiment, the sequence is repeated.

The configuration shown in FIG. 6, and variations on that configuration that will be apparent to one of skill in the art in view of this disclosure, can be provided with all of the connections to drive and sense circuitry on one edge, thus permitting use in designs with edge constraints on at least three sides. As will be discussed in more detail below, care must be taken to shield the off-touch sensor drive lines from the off-touch sensor sense lines so that one does not affect the other. In an embodiment, the connections for one or two groups of touch sensor conductors are provided on one edge, while the connections for the other one or two groups of touch sensor conductors are provided on the other edge. In an embodiment, touch sensor conductors used as drive lines share a common edge for connection, and touch sensor conductors used as sense lines share a common edge for connection. In an embodiment, the common edge used for drive lines and the common edge used by sense lines are different edges. In an embodiment, the common edge used for drive lines and the common edge used by sense lines are opposite edges. Such a configuration may reduce or eliminate shielding requirements. Moreover, in an embodiment, such a configuration may be used to keep stimulating circuits physically separate from sensing circuits.

FIG. 7A shows an example of a connector 700 (portions made see-thru for illustrative purposes) that may be employed in connection with, e.g., the sensor 600 for detecting touch illustrated in FIG. 6. FIG. 7B shows the connector 700 and the leads 702 and terminals 704 on one side of the connector, while FIG. 7C shows connector 700 and the leads 706 and terminals 708 on the other side of the connector. The leads 706 and connections 708 seen in FIG. 7C are shown in phantom in FIG. 7A. In an embodiment, connector 700 is used in combination with the sensor 600. In an embodiment, leads 702 connect to the non-crossing touch sensor conductors 602, and leads 706 connect to the crossing touch sensor conductors 604, 606. Connector 700 is suitable for use as part of a connection between the touch sensor conductors 602, 604, 606 of the sensor 600 and drive and sense circuitry, and because the leads 702 are situated to connect to touch sensor conductors 602 and the leads 706 are situated to connect to touch sensor conductors 604, 606, connector 700 is particularly suited for an embodiment where: (i) non-crossing touch sensor conductors 602 are drive lines and the crossing touch sensor conductors 604, 608 are sense lines; or (ii) non-crossing touch sensor conductors 602 are sense lines and the crossing touch sensor conductors 604, 608 are drive lines. Grounding 710 separates the front and back of the connector to mitigate mixing or interference between signals on leads 702 and signals on leads 706.

When connector 700 is used in combination with the sensor 600, the connector 700 routes an electrical connection from non-crossing touch sensor conductors 602 to terminals 704, and an electrical connection from crossing touch sensor conductors 604, 606 to terminals 708. In an embodiment, the terminals 704, 708 provide an edge connector for easy plug-in operation. In an embodiment, drive circuitry and sense circuitry are available on an edge connection (not shown) that mates with the connector 700.

FIG. 9 provides a functional block diagram of an illustrative frequency division modulated touch detector. Sensor 600 (see FIG. 6) is shown schematically. In an embodiment, stimulation signals are transmitted to drive lines 702 of the touch sensor 230 via drive circuitry including digital-to-analog converters (DAC) 236, 238 and time domain received signals are sampled from the sense lines 706 by sense circuitry comprising analog-to-digital converters (ADC) 244, 246. In an embodiment, the transmitted signals are time domain signals generated by signal generators 248, 250 which are operatively connected to the DAC 236, 238. In an embodiment, a Signal Generator Register Interface block 224 operatively connected to the System Scheduler 222, is responsible for initiating transmission of the time domain signals based on a schedule. In an embodiment, Signal Generator Register Interface block 224 communicates with Frame-Phase Sync block 226, which causes Peak to Average Filter block 228 to feed Signal Generator blocks 248, 250 with data necessary to cause the signal generation.

In an embodiment, changes in the received signals are reflective of touch events at the touch sensor 600 (e.g., touch delta), noise and/or other influences. In an embodiment, the time domain received signals are queued in hard gates 252, before they are converted into the frequency domain by FFT block 254. In an embodiment, a Coding Gain Modulator/Demodulator block 268 provides bidirectional communications between the Signal Generator blocks 248, 250 and hard gates 252. In an embodiment, a temporal filter block 256 and level automatic gain control (AGC) block 258 are applied to the FFT block 254 output. In an embodiment, the AGC block 258 output is used to prove heat map data and is fed to UpSample block 260. In an embodiment, UpSample block 260 interpolates the heat map to produce a larger map in an effort to improve accuracy of Blob Detection block 262. In an embodiment, up sampling can be performed using a bi-linear interpolation. In an embodiment, Blob Detection block 262 performs post-processing to differentiate targets of interest. In an embodiment, Blob Detection block 262 output is sent to Touch Tracking block 264 to track targets of interest as they appear in consecutive or proximal frames. In an embodiment, Blob Detection block 262 output components can also be sent to a multi-chip interface 266 for multi-chip implementations. In an embodiment, from the Touch Tracking block 264, results are sent to the Touch Data Physical Interface block 270 for short distance communication via QSPI/SPI.

In an embodiment, there is one DAC per channel. In an embodiment, each DAC has a signal emitter that emits a signal induced by the signal generator. In an embodiment, the signal emitter is driven by analog. In an embodiment, the signal emitter can be a common emitter. In an embodiment, signals are emitted by a signal generator, scheduled by the system scheduler, providing a list of digital values to the DAC. Each time the list of digital values is restarted, the emitted signal has the same initial phase.

In an embodiment, the frequency division modulated touch detector (absent the touchpad sensor) is implemented in a single integrated circuit. In an embodiment, the integrated circuit would have a plurality of ADC inputs and a plurality of DAC outputs. In an embodiment, the integrated circuit would have 36 ADC inputs and 64 orthogonal DAC outputs. In an embodiment, the integrated circuit is designed to cascade with one or more identical integrated circuits, providing additional signal space, such as 128, 192, 256 or more simultaneous orthogonal DAC outputs. In an embodiment, the ADC inputs are capable of determining a value for each of the DAC outputs within the signal space of the orthogonal DAC outputs, and thus, can determine values for DAC outputs from cascaded ICs as well as DAC outputs on the IC where the ADC resides.

In an embodiment such as that shown in FIG. 9, because the touch detection logic is now looking, for example, for 4 bins present per receiver, the beat Vpp is fairly manageable, and the overall baseline signal in the FFT increases very substantially. Furthermore, the overall sensor can run at a much higher baseline signal per transmitter than previous sensors.

Because the touch detection logic is looking for a differential signal, it may be possible in a particular application to provide some common mode rejection, perhaps eliminating the effect of some common mode noise sources. The effectiveness of such common mode rejection for a particular application depends at least in part upon how noise affects the FFT magnitudes.

Vehicle Implementation of Sensors-Steering Wheel

Figure 10A:
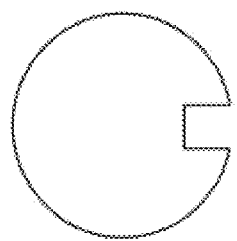
FIG. 10A is an illustration of a cross section of partial toroid.
Figure 10B:
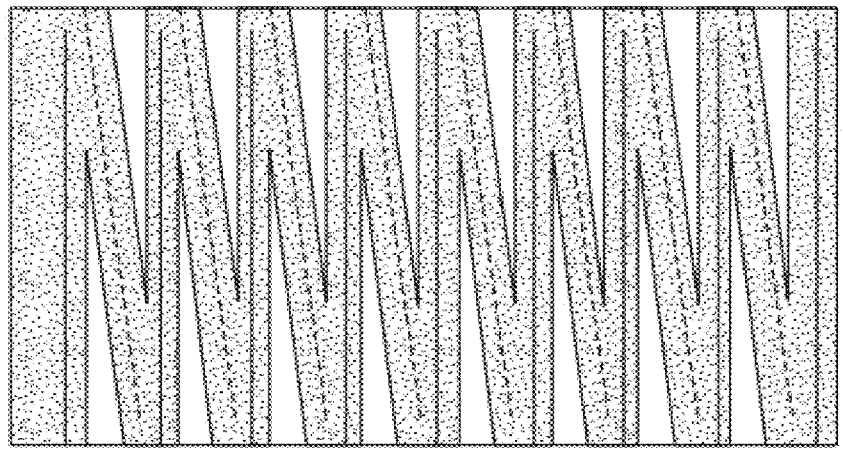
FIG. 10B is an illustration of one embodiment of a sensor that may be used in conjunction with a partial toroid such as the one shown in FIG. 10A.

FIG. 10A shows an illustration of a cross section of a partial toroid as may commonly be found in a steering device. FIG. 10B is an illustration of an embodiment of portions of a sensor that may be used in conjunction with a partial toroid such as the one shown in FIG. 10A. In an embodiment, two sets of conductors are interleaved, one set terminating at one end and the other set terminating at the other end, so that each conductor within a set can be routed to a transmitter or receiver at the same end as the other conductors in the set. In an embodiment, the two sets of conductors are interleaved on a flexible substrate, one set terminating at or near one edge of the substrate, and the other set terminating at or near an opposing edge of the substrate. In an embodiment, at least one set of conductors are operatively connected to transmitters adapted to transmit unique, orthogonal signals thereon. In an embodiment, both sets of conductors are operatively connected to transmitters adapted to transmit unique, orthogonal signals thereon. In an embodiment, at least one set of conductors are operatively connected to receivers adapted to receive signals thereon. In an embodiment, both sets of conductors are operatively connected to receivers adapted to receive signals thereon.

In the illustrated embodiment, the conductors of the first and second conductor sets are not parallel to each other, but rather, are arranged in a manner that the relationship between them changes along the vertical length as oriented in the drawing. In an embodiment, the first and second conductor sets are oriented such that any given linear position along the vertical length of the conductor (i.e., up and down on the illustrated figure) corresponds to a different distance between the conductors. In an embodiment the conductors are placed about the toroid or partial toroid. In an embodiment, the conductors are disposed upon a substrate that can be wrapped about the toroid or partial toroid. In an embodiment, the conductors are disposed upon a substrate that is notched or otherwise designed to be wrapped about a toroid or partial toroid or other curved shape.

Figure 8:
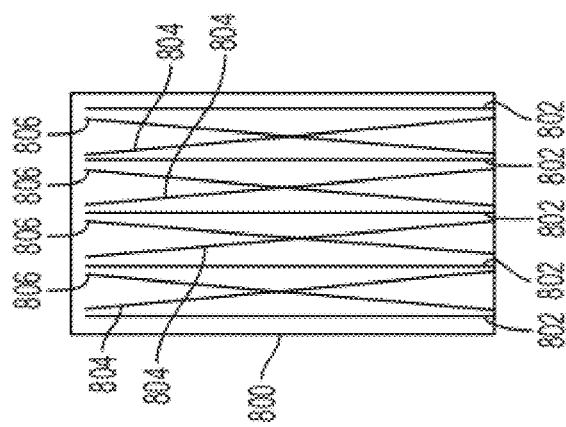
FIG. 8 shows a schematic illustration of yet another embodiment of a sensor for detecting touch.
Figure 11A:
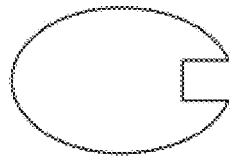
FIG. 11A is an illustration of a cross section of partial toroid that is more oval than the one shown in FIG. 10A.
Figure 11B:
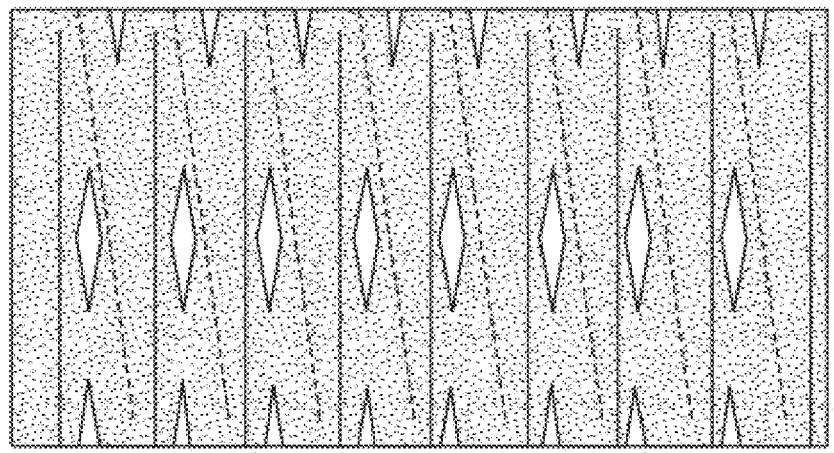
FIG. 11B is an illustration of one embodiment of a sensor that may be used in conjunction with a partial toroid such as the one shown in FIG. 11A.

In an embodiment, the sensor pattern of FIG. 10B and FIG. 11B may comprise additional diagonal conductors as generally shown in FIGS. 6 and 8. The additional diagonal conductors may be on a separate layer, or separate from the shown conductors with bridges as discussed above.

FIGS. 11A-11B show another embodiment of a cross section of a portion of a complex shape, and another pattern of two sets of conductors that may be wrapped about the complex shape.

In an embodiment, one set of conductors may operate as transmitters and the other set as receivers. In an embodiment, both sets of conductors may be both transmitters and receivers.

Figure 12A:
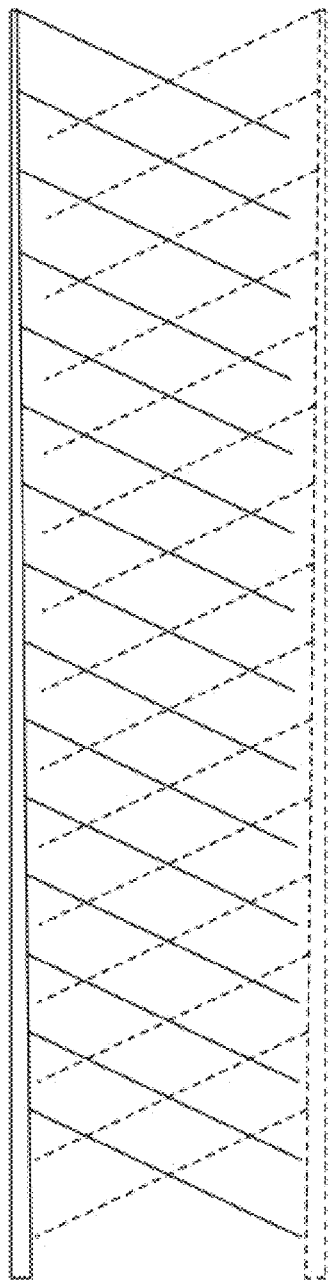
FIGS. 12A-12E each show illustration of various embodiments of a sensor pattern that may be advantageous for use in connection with portions of a complex shape.

Turning briefly to FIGS. 12A-12E, illustrations are shown of various embodiments of a sensor pattern that may be advantageous for use in connection with portions of a complex shape such as a toroid. In FIG. 12A, as above, two sets of conductors are provided, which may be connected to transmitters, receivers or both. In an embodiment, one set of sensors (e.g., the set that are connected toward the bottom of the drawing, for example) are used as transmitters, and the other set used as receivers. Because each of the transmitter conductors cross only a limited number of receiver conductors, in an embodiment, frequencies can be reused. In the illustrated embodiment, none of one set of the sensors crosses more than three of the other set of sensors, and thus, only three unique, orthogonal signals are required to operate regardless of the total length of the sensor. In an embodiment, leads connecting the transmit conductors to a signal source can be common among transmit conductors using a common frequency. In an embodiment configured as illustrated, three separate leads would be required for all of the transmit conductors because the transmitters require only one from the signal generator to the transmit conductor per unique signal.

The illustration in FIG. 12A shows the sensor conductors crossing at approximately 120 degrees. In an embodiment, the sensor conductors from the two sets cross each other at an angle of 90 degrees. In an embodiment, the sensor conductors from one set cross the sensor conductors from another set at an angle differing from 120 degrees that causes each sensor conductor from one set to cross more sensors from the other set. In an embodiment, the sensor conductors from one set cross the sensor conductors from another set at an angle differing from 120 degrees that causes each sensor conductor from one set to cross fewer sensors from the other set. In an embodiment, the sensor conductors from the two sets cross each other at an angle less than 45 degrees. In an embodiment, the sensor conductors from the two sets cross each other at an angle greater than 135 degrees.

Figure 12B:
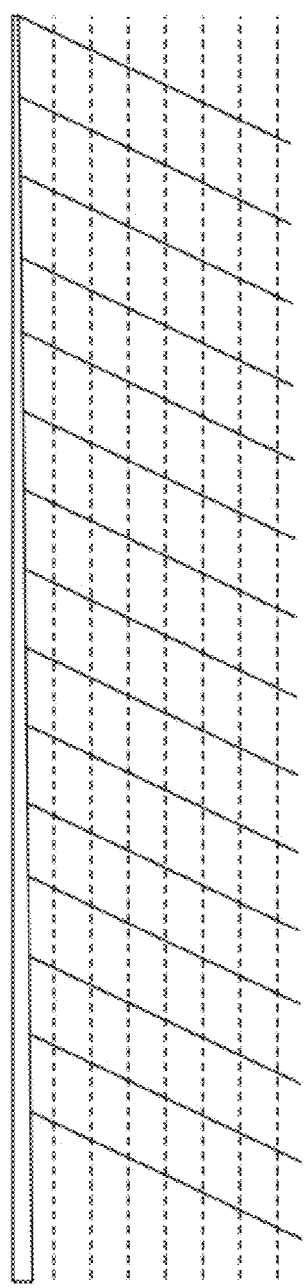

FIG. 12B shows another embodiment of a sensor pattern that may be advantageous for use in connection with portions of a complex shape such as a toroid. In an embodiment, one set of the conductors runs generally parallel to each other, while the other set of sensors runs at an angle to, and crosses each of the conductors in the first set, and each are attached to leads as shown at the top of the drawing. In FIG. 12A, one set of the conductors runs generally parallel to each other, while the other set of sensors runs at a 90-degree angle to, and crosses each of the conductors in the first set, and each of them are attached to leads. In an embodiment, one set of sensors is attached via leads to a receiver that can receive signals present on the conductors. In an embodiment, one set of sensors is attached via leads to a signal source that can transmit signals on the conductors. In an embodiment, both sets of sensors are attached via leads to a receiver that can receive signals present on the conductors. In an embodiment, at least one of the sets of sensors are attached via leads to a receiver that can receive signals present on the conductors and at least one of the sets of sensors are attached vial leads to a signal source that can transmit signals on the conductors. In an embodiment, both sets of sensors are attached via leads to a receiver that can receive signals present on the conductors and to a signal source that can transmit signals on the conductors.

Figure 12C:
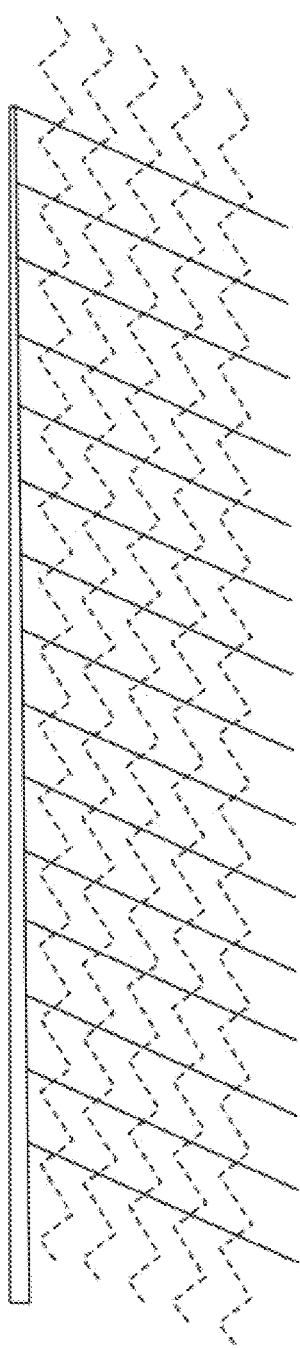

In an embodiment, sensor patterns may be disposed on a flexible substrate that can be stretched to accommodate the size and shape of the curved surface, e.g., steering wheel, on which it is wrapped. Because the conductors may lack expandability (e.g., or stretchability) sufficient to permit the flexible substrate to be stretched around such a curve, in an embodiment, excess conductor may be placed on the substrate. As shown in FIG. 12C, the horizontally arranged conductors are placed on a substrate in a zig-zag pattern to facilitate expansion in the horizontal dimension. The zig-zag pattern is not required, and any of wide variety of patterns that may be used that permit expansion in the horizontal direction (e.g., wave-like patterns). Moreover, flexibility may be achieved in both the horizontal and vertical direction by applying patterns that can permit expansion (e.g., zig-zag, waves, etc.).

Figure 12D:
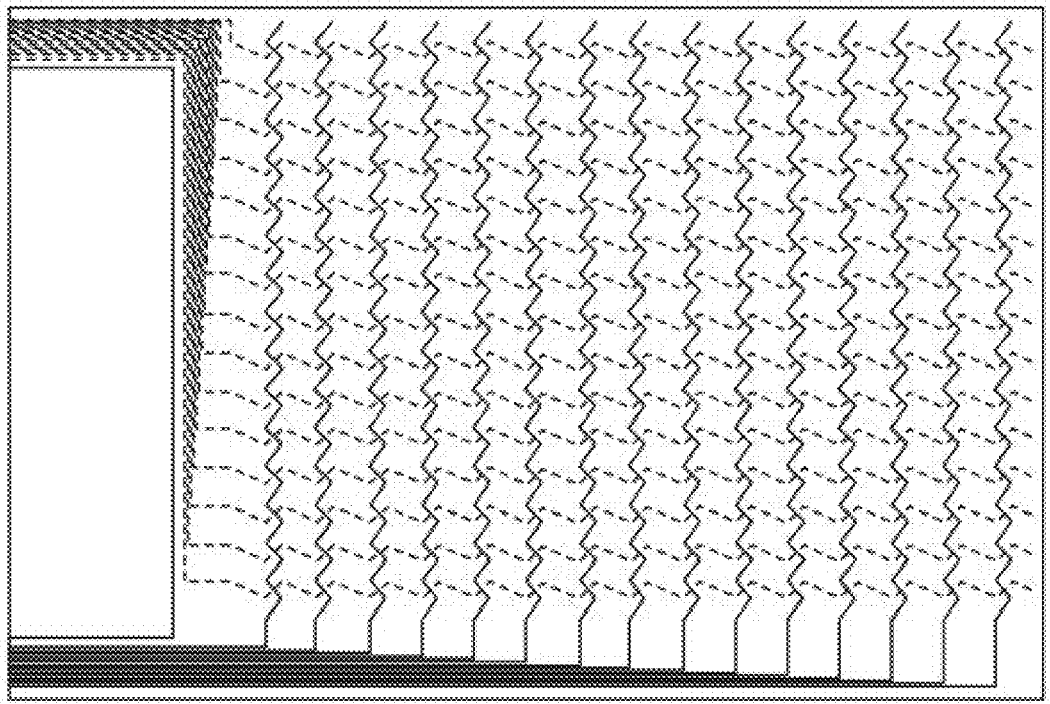
Figure 12E:
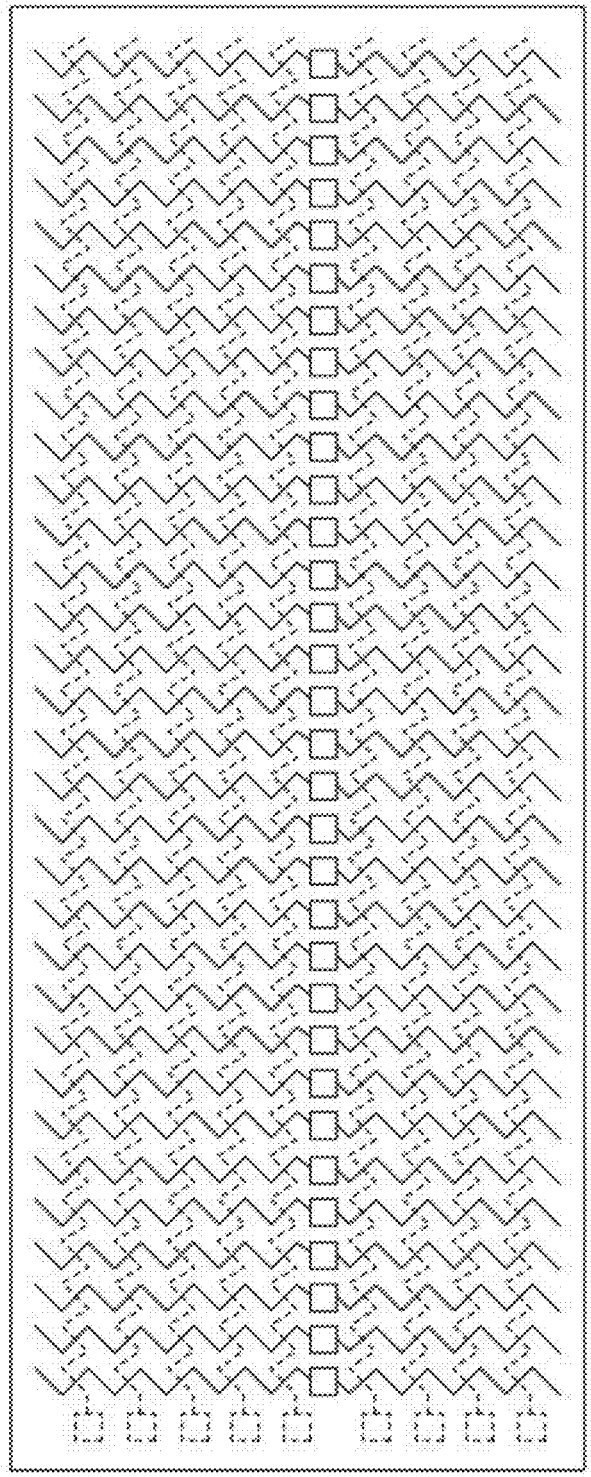

FIGS. 12D and 12E show sensor patterns that are expandable along both X and Y directions. In FIG. 12D, leads attachments are accommodated at edges of the substrate, while in FIG. 12E, one set of leads can be attached at an edge, while the other set can be attached, for example, in a channel or other central area of a shape on which the sensor pattern is used.

In an embodiment, conductors can be placed upon, or embedded in a flexible substrate (which could be made from a non-conductive fabric, plastic or elastomeric material). In an embodiment, a conductive thread is placed on or stitched into a flexible material (e.g., fabric) in a manner that permits a desired expansion (e.g., zig-zag, waves, etc.) in one or more desired dimensions. In an embodiment, a flexible substrate or fabric has crossing zig-zag patterns (or e.g., crossing sine wave patterns).

In an embodiment, a two-dimensional sensor pattern can be designed to accommodate expansion (in one or more directions) and then applied to a surface where the expansion occurs. In an embodiment, where the desired maximum amount of expansion (e.g., stretch) is known at sensor-pattern design time, such as when designing a sensor pattern for a known shape such as a steering wheel, a two-dimensional sensor pattern can be designed so that the pre-expanded sensor pattern accommodates the known or desired maximum expansion. In an embodiment, the two-dimensional sensor pattern is designed so as to be in its expanded and desired configuration once it is applied to the shape (e.g., steering wheel). In an embodiment, sensor patterns are designed in CAD systems on the three-dimensional objects, and may be "unfolded" into a two-dimensional pattern for fabrication using the facilities of the CAD program.

In an embodiment, the sensor patterns shown in FIGS. 12A-12E may be wrapped about a portion of a toroidal shaped object such as a steering wheel. In an embodiment, sensor patterns such as those shown in FIGS. 12A-12E are wrapped about portions of the steering wheel that are roughly equivalent to quadrants thereof. In an embodiment, sensor patterns are wrapped about the upper half of a steering wheel. In an embodiment, two separate sensor patterns similar to those in FIGS. 12A-12E are wrapped in left and right portions of the upper portion of a steering wheel.

Figure 13A:
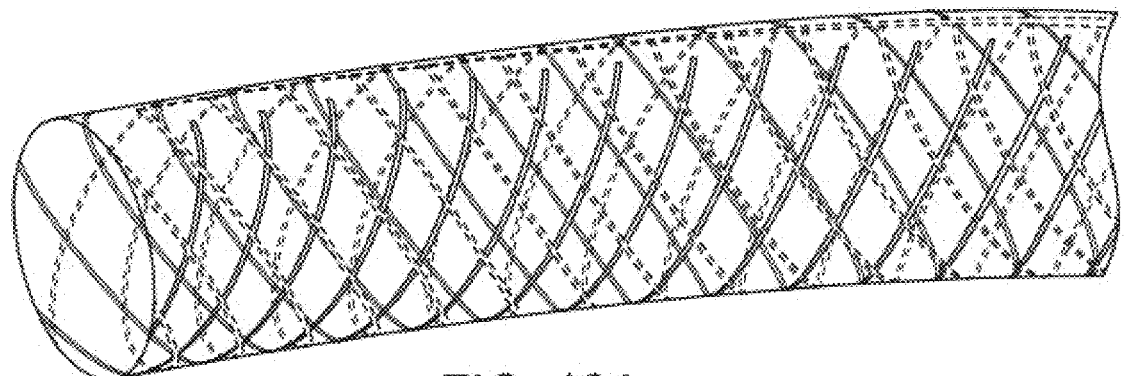
FIGS. 13A-13C shows several views of an embodiment of a crossing sensor pattern in a toroidal configuration.
Figure 13B:
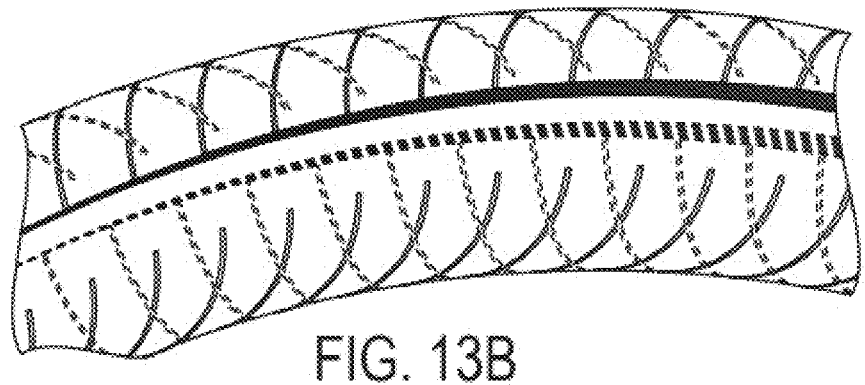
Figure 13C:
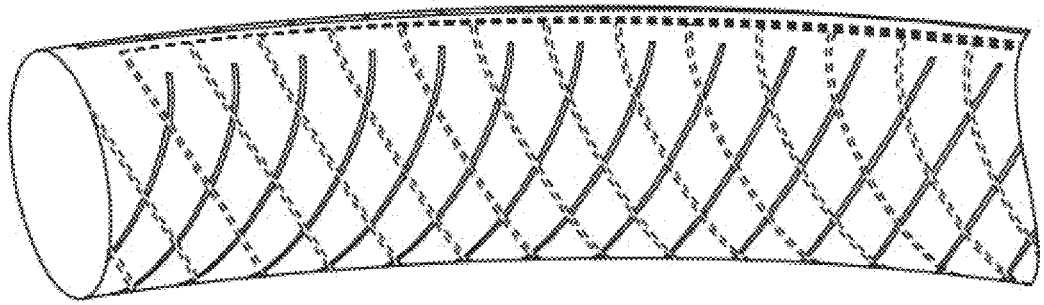
Figure 14A:
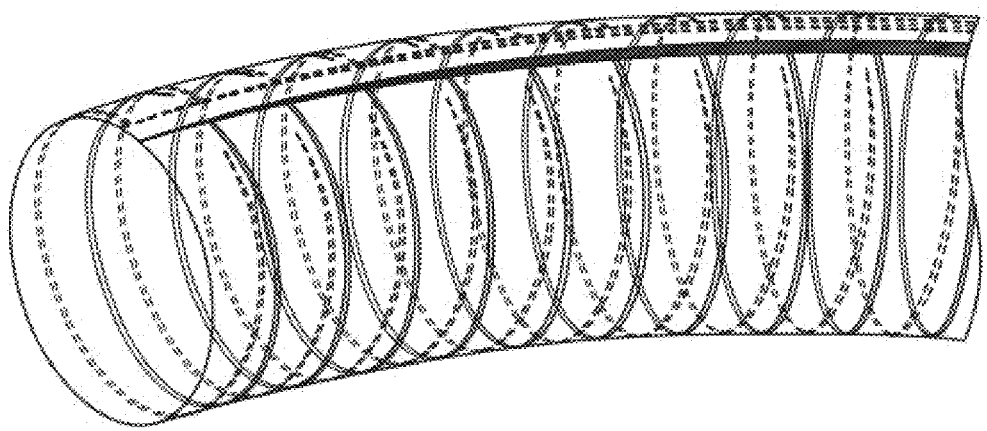
FIGS. 14A-14C shows several views of an embodiment of a non-crossing sensor pattern in a toroidal configuration.
Figure 14B:
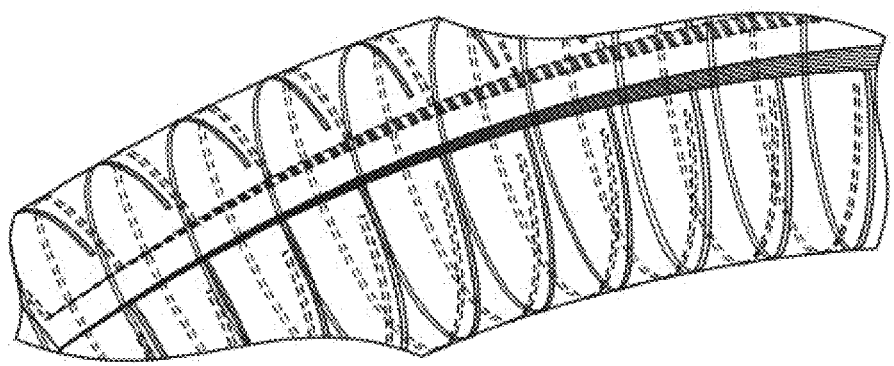
Figure 14C:
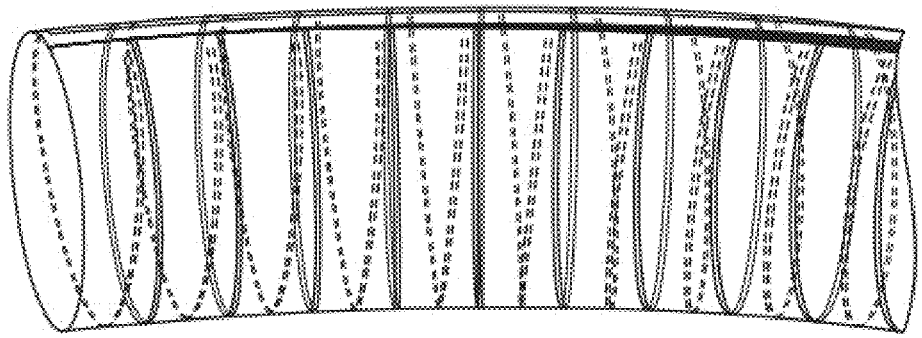

FIGS. 13A-13C shows three views of an embodiment of a crossing sensor pattern in a partial toroidal configuration. The leads from each conductor back to the transmitters or receivers can be seen best in FIG. 13B. FIGS. 14A-14C shows several views of an embodiment of a non-crossing sensor pattern in a toroidal configuration. The leads from each conductor back to the transmitters or receivers can be seen best in FIG. 14B.

Vehicle Implementation of Sensors-Car Seat

In addition to a steering wheel, as discussed above, transmitting antennas (also referred to as conductors) and receiving antennas (also referred to as conductors) can be implemented in the materials and fabrics used within or on other components of the vehicle. One such implementation of placing the sensors within or on other components of the vehicle is within materials forming the car seat, such as fabrics, leather, etc. In an embodiment, sensors are located within seats made of cloth. In an embodiment, sensors are located on seats made of cloth. In an embodiment, sensors are located within seats made of leather. In an embodiment, sensors are located on seats made of leather. In an embodiment, sensors are located within seats made of plastic. In an embodiment, sensors are located on seats made of plastic.

Figure 15:
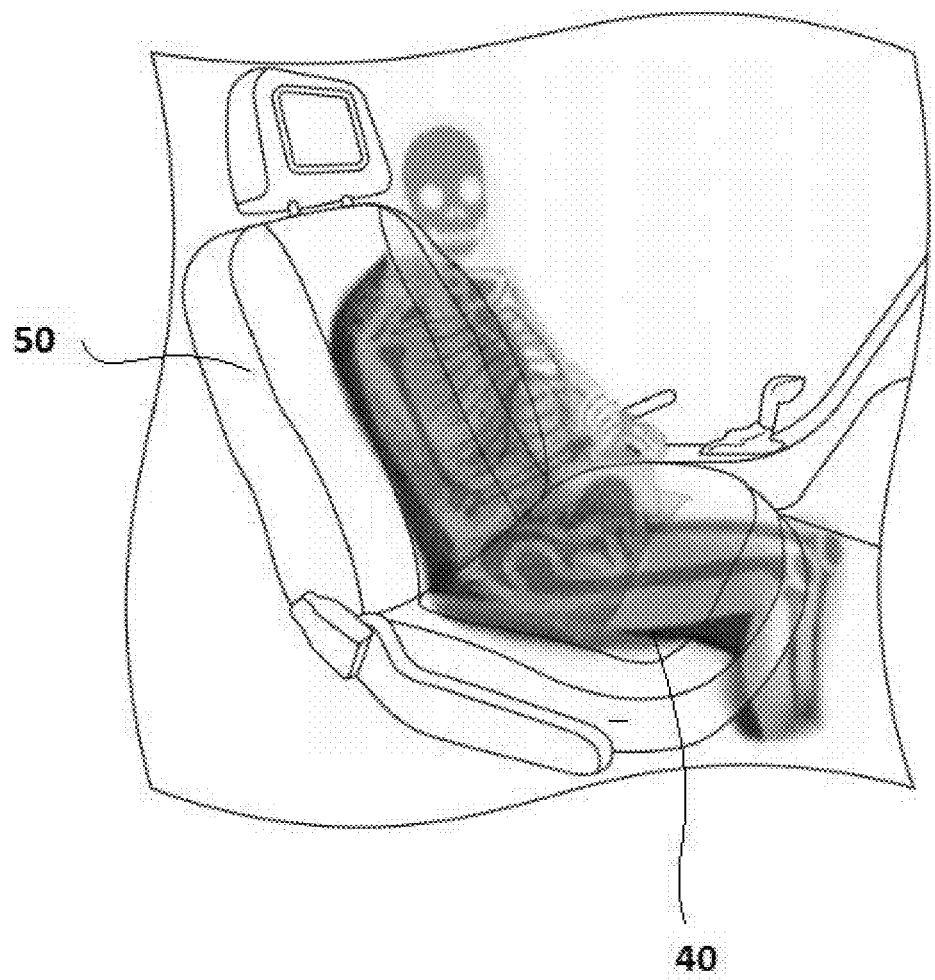
FIG. 15 is an illustration of an occupant in a vehicle.
Figure 16:
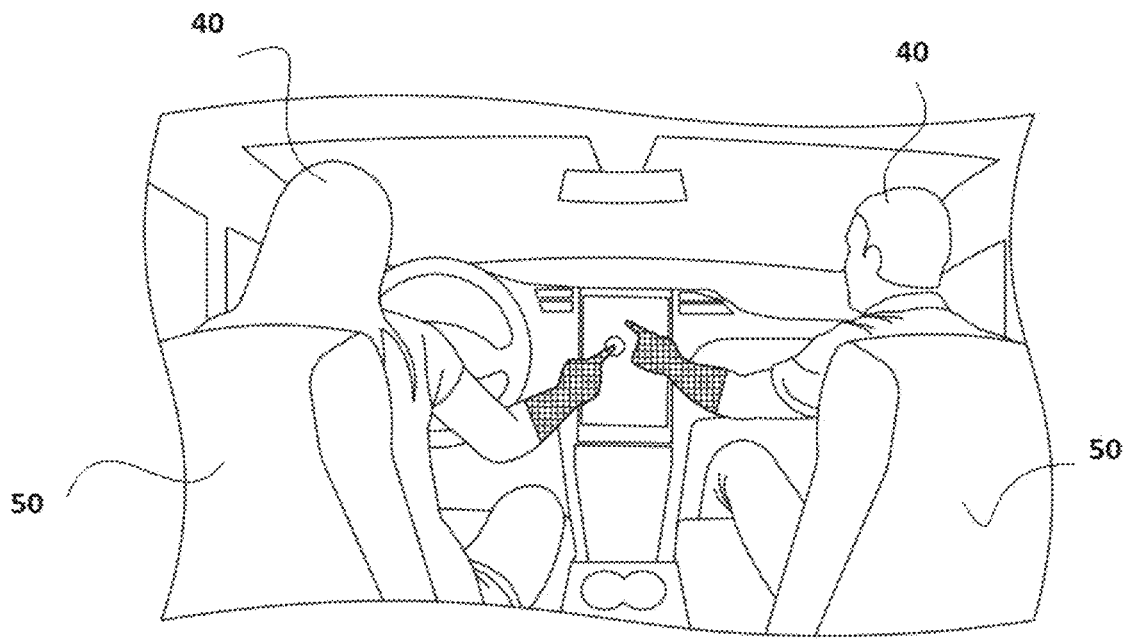
FIG. 16 is an illustration of occupants within a vehicle.

Referring to FIGS. 15 and 16, shown are occupants 40 sitting on seats 50 located within a vehicle. While seats 50 shown are the seats located in the front row, it should be understood that any of the potential seats located within the vehicle may have sensors implemented therein or on.

Figure 17A:
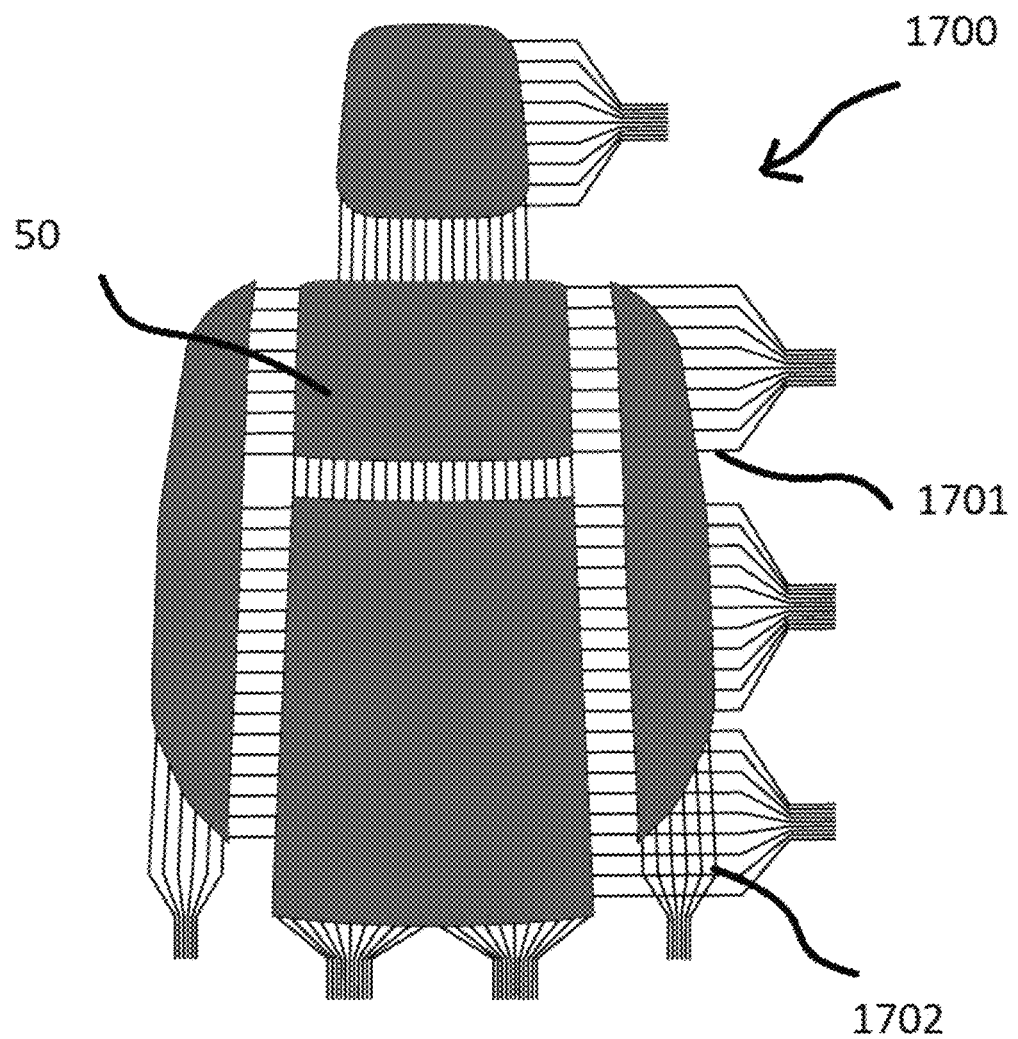
FIG. 17A shows a front view of an embodiment of a sensor used with a vehicle seat.
Figure 17B:
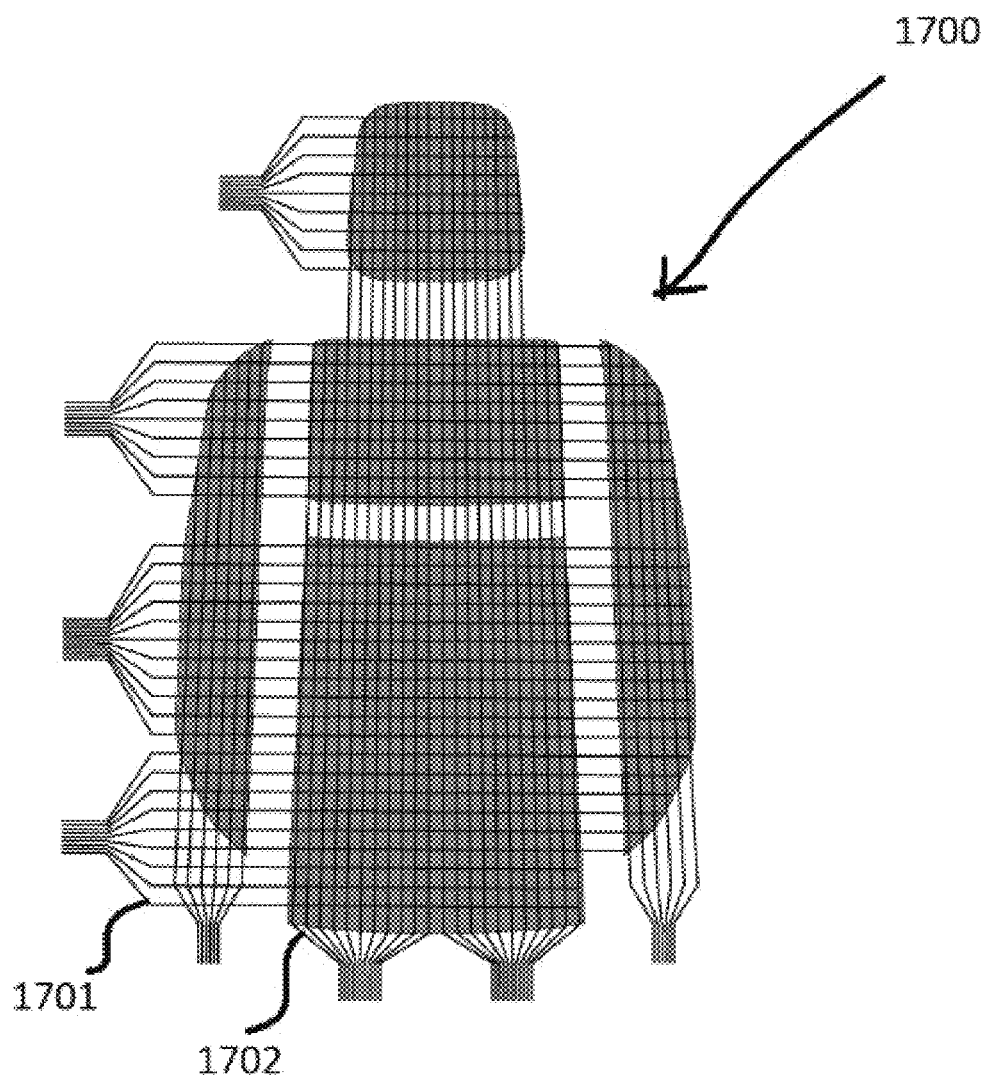
FIG. 17B shows a back view of an embodiment of sensor used with a vehicle seat.

FIGS. 17A and 17B show an exemplary embodiment of a sensor 1700 that is used with a seat 50. FIG. 17A shows a front view of a top layer of the seat 50. FIG. 17B shows a rear view of the top layer of the seat 50. The sensor 1700 is formed with transmitting antennas 1701 and receiving antennas 1702, which are operably connected to a at least one transmitter (not shown), at least one receiver (not shown) and at least one signal processor (not shown). Transmitting antennas 1701 can also function as receiving antennas and receiving antennas 1702 can also function as transmitting antennas. In an embodiment, there is more than one sensor 1700 layer used in the seat 50. In an embodiment, each portion of the seat 50 has its own sensor. In an embodiment, only some portions of the seat 50 have sensors. In FIGS. 17A and 17B, the sensor 1700 is formed within the entirety of the seat 50.

In an embodiment, the material of a seat has embedded within it a sensor formed of transmitting and receiving antennas (also referred to herein as conductors). In an embodiment, the material of the seat has placed on it a sensor formed of transmitting and receiving antennas. In an embodiment, the seat has embedded within it and placed upon it sensors formed of transmitting and receiving antennas. In an embodiment, antennas are placed upon a flexible substrate (which could be made from a non-conductive fabric, plastic or elastomeric material) and used to form the material of the seat. In an embodiment, antennas are embedded within a flexible substrate and used to form the material of the seat. In an embodiment, a conductive thread is placed on or stitched into a flexible material (e.g., fabric) in a manner that permits a desired expansion (e.g., zig-zag, waves, etc.) in one or more desired dimensions and used to form the seat. In an embodiment, a flexible substrate or fabric has crossing zig-zag patterns (or e.g., crossing sine wave patterns) and used to form the seat. In an embodiment, the flexible substrate or the fabric has one of the patterns discussed above or another pattern adapted to withstand the flexible use by people.

A transmitter transmits a unique frequency orthogonal signal on each of the transmitting antennas. Receiving antennas can receive the transmitted signals and/or respond to the capacitive interaction that can occur through usage of the material. A signal processor takes a measurement of the received signals and uses the measurements in order to form a heat map, or other set of data, reflecting the interaction that is occurring with the car seat. In an embodiment, each of the transmitting antennas and each of the receiving antennas functions as either a transmitting antenna or receiving antenna. In an embodiment, there is at least one transmitting antenna and a plurality of receiving antennas. In an embodiment, there is plurality of transmitting antennas and at least one receiving antenna.

When an occupant 40 sits on the seat 50 in the car there is movement of and/or within the seat 50. The material from which the seat 50 is formed moves and/or flexes. This movement causes the transmitting antennas and receiving antennas to move with respect to each other. This movement impacts the measurement of signal that is received by the receiving antennas. This movement not only occurs when an occupant 40 sits on the seat 50, but also during the movement of the vehicle and while the occupant 40 is sitting on the seat 50 when the car is at rest.

Processed measurements taken from the receivers connected to the receiving antennas can be used in order to determine whether or not an occupant 40 is seated on the seat 50. The measurements taken from the signal processor are able to be used by a detector module to be further processed in order to determine a use of the seat 50. In an embodiment, a detector module is run on the signal processor and is able to take the measurements and determine if there is a use of the seat. In an embodiment, the detector module is software logic that processes the measurements processed by the signal processor. In an embodiment, the detector module is located separately from the signal processor. In an embodiment, the detector module is circuitry that processes the measurements processed by the signal processor. In an embodiment, the detector module is located in the vehicle at a location away from the seat. In an embodiment, the detector module is located in the vehicle at a location proximate to the seat.

In an embodiment, the detector module detects a presence or absence of an occupant of the vehicle. In an embodiment, the detector module detects a biometric of an occupant. In an embodiment, the detector module determines the heart rate of an occupant. In an embodiment, the detector module determines respiratory activity of an occupant. In an embodiment, the detector module determines a weight estimate of an occupant. In an embodiment, the detector module determines a height estimate of an occupant. In an embodiment, the detector module detects a position of an occupant within the seat. In an embodiment, the detector module detects a type of occupant within the seat. In an embodiment, the detector module determines if a car is stolen based on detected occupant ID. In an embodiment, the detector module detects the presence of a child. In an embodiment, the detector module detects the presence of a child seat. In an embodiment, the detector module detects the presence of a child in the child seat. In an embodiment, the detector module detects a position of the occupant. In an embodiment, the detector module determines position of the seat back. In an embodiment, the detector module determines comfort settings of a seat. In an embodiment, the detector module detects the distance of a head from head rest. In an embodiment, the detector module detects a type of % classification category of occupant vs. non-occupant detection (i.e. an object present but exclusively not a human occupant). In an embodiment, the detector module determines if something is left behind in a vehicle. In an embodiment, the detector module detects an object. In an embodiment, the detector module detects a type an object via passive means. In an embodiment, the detector module detects an object via active means. In an embodiment, the detector module detects a type of occupant object by either active and/or passive means. In an embodiment, the detector module detects at least one of a person, car seat, purse, laptop, phone, dog, cat, etc. In an embodiment, each logic category (i.e., presence or absence of human occupant), or measurement estimation (i.e. height weight) can each separately also include a calculated factor of confidence (i.e. confidence level) (e.g. 99.9999% empty, 80% confidence height 5'6"). In an embodiment, the detector module detects cushion and back pressure distribution. In an embodiment, the detector module determines dynamic movement, such as how much and how often an occupant moves.

As noted above, information in addition to presence regarding the occupant 40 can be ascertained due to the sensitivity of the sensors being implemented. In an embodiment, machine learning is applied to the data received from the measurements taken by the sensors within or on the seat 50 in order to accurately determine the weight of the individual sitting on the seat 50. By being able to accurately determine physical characteristics of the person sitting on the seat 50, the car can further be programmed to respond accordingly by correlating the weight of the person with the likely identity of the driver. For example, the car may automatically adjust its settings when the seat 50 senses that a 185 pound man is sitting in the car. The settings of the car may be adjusted for the person most likely associated with the 185 pound weight reading. In an embodiment, the number of occupants in a vehicle is determined using the measurements from the car seat sensors and the detector module. In an embodiment, the number of and weight of the occupants in a vehicle is determined using the sensors. In an embodiment, the vehicle is programmed in order to determine the identity of the occupants 40 based upon where they are sitting, their weight and/or other physical characteristics ascertained via the sensors in the car seat 50. In an embodiment, the vehicle optimizes fuel usage based on the vehicle load determined by the sensors. In an embodiment, sensors in the passenger area determine, based on the weight reading, if there remains an infant in a car seat. This reading is then used to trigger an alarm, or other warning indicator, if the infant is not removed when the vehicle is stopped for a period of time.

It should be understood that sensors may be located at other locations on and within the seat 50 in addition to the sitting area of the seat 50. In an embodiment, sensors are located within the back area of the seat 50. Sensors located in the back area of the seat 50 can be used in order to determine information regarding various movements of the occupant. For example, sudden movements can be used in order to determine additional information related to the speed of the vehicle or the terrain the vehicle may be moving over. In an embodiment, this type of information is used by the vehicle to adjust the controls of the vehicle or the movement of the vehicle. For example, in an embodiment, determination that there is sudden movement or jerking over a threshold deploys airbags or trigger brake activity. In an embodiment, sensors are located within the headrest of the vehicle. In an embodiment, biometric data is taken regarding the occupant 40 based upon his or her interaction with the seat 50. In an embodiment, the position and movements of an occupant 40 are used to determine if the occupant 40 is falling asleep. An alarm can be triggered if the occupant is falling asleep. Other potentially dangerous situations can also be monitored and detected by the sensors based on positioning and movements of the occupant 40 while on the seat 50, such as distracted driving and driving under the influence of a substance.

Referring to FIGS. 15 and 16, in addition to the sensors located within and/or on the seat 50 where the interaction between the transmitting antennas and the receiving antennas is detected, an infusion transmitting antenna can be located within and/or near the seat. Infusion is discussed further below in more detail. In an embodiment, the user holds or wears an object separate from the car that is able to transmit a unique orthogonal signal. In an embodiment, the user has a signal infused via one of the components of the vehicle. In an embodiment, signal is infused into the user via the steering wheel. In an embodiment, signal is infused into a user via the dashboard. In an embodiment, a signal is transmitted into the user via an interior portion of the vehicle. In an embodiment, a signal is transmitted in the user via an exterior portion of the vehicle.

FIG. 16 shows shading of the occupants 40 that illustrates the presence of an infused signal within the occupants 40. The infused signal may be used to provide additional functionality with respect to the instruments located on the vehicle's dashboard or throughout the vehicle. In an embodiment, various settings are enabled or disabled based upon the signal transmitted by the occupant 40. In an embodiment, controls are enabled or disabled based upon the signal transmitted by the occupant 40. In an embodiment, garage door openers are activated by the signal transmitted by the occupant 40 via interaction with the interior of the vehicle.

Furthermore, while car seats are shown, it should be understood that the sensors can be used with the seats of vehicles other than cars. In an embodiment, the sensors are used in truck seats. In an embodiment, the sensors are used in boat seats. In an embodiment, the sensors are embedded in waterproof material in the boat seats. In an embodiment, the sensors are used in plane seats. In an embodiment, the sensors are used in train seats. Also, while the seats discussed herein are discussed within the context of vehicles, seats, chairs and the like, the sensor technology can be implemented within or on fabrics and materials within seats found elsewhere. In an embodiment, the sensors are used in stadium seats. In an embodiments, the sensors are used with chairs within homes. In an embodiment, the sensors are used with seating in waiting rooms. In an embodiment, the sensors are used with seating on rides in amusement parks.

Additionally, while car seats are discussed, the transmitters, transmitting antennas, receiving antennas and receivers forming the sensors may be implemented in other components of the vehicle. In an embodiment, sensors are placed within the accelerator of the vehicle. Interactions with the accelerator can provide additional and more nuanced information regarding the acceleration of the vehicle. Fuel distribution and gear manipulation may be adjusted due to the information provided by the sensors in the accelerator. In an embodiment, sensors are placed on the gear shift of the vehicle. In an embodiment, sensors are placed on the handles of the vehicle, such as a motorcycle, three-wheeler or quad-cycle. In an embodiment, sensors are placed on the brakes of the vehicle. Interaction with the brakes can provide information related to the handling of the vehicle or implementation of airbags, etc. In an embodiment, sensors are implemented in the dashboard. In an embodiment, sensors are implemented in the clutch. In an embodiment, sensors are implemented in the turn signal controllers.

In an embodiment, transmitting antennas and receiving antennas forming sensors are implemented in the tires of the vehicle. The measurements of the signals are used to determine wear of the brakes and wear of the tires. Transmitting antennas may be implemented on the components and processed signals received by the receivers can determine variations in the measurements of received signals in order to determine alterations to the materials of the components. In an embodiment, sensors are located on the windshield. The signal transmitted via the transmitting antennas can be impacted by the liquid and reflected in the measurements processed by the signal processor. These measurements may then be used to trigger the windshield wipers to activate.

Fabric Implementation of Sensors

Implementation of sensors in materials such as fabrics were discussed above with respect to car seats. Other implementations of sensors in fabrics can be taken outside of the realm of car seats and vehicles in general and applied to materials used in consumer products. In an embodiment, sensors are employed in furniture. In an embodiment, sensors are implemented in clothing and other wearables. In an embodiment, sensors are implemented in carpets.

Figure 18:
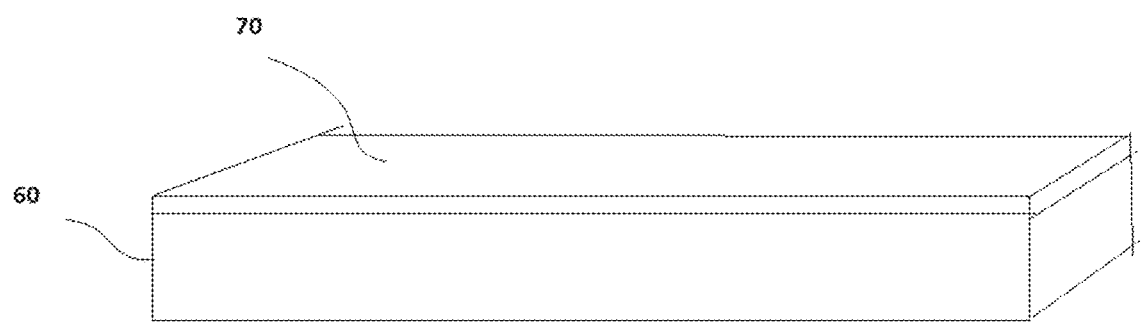
FIG. 18 shows a mattress having a top sensor portion.

FIG. 18 shows another embodiment of the implementations of the sensors. Shown in FIG. 18 is a mattress 60 that has an upper sensor surface 70 that is either formed integral with the mattress 60 or is a separate component that is placed on or added to the mattress 60 at a later point. In an embodiment, the mattress 60 has a sensor surface 70 formed integral with the mattress. In an embodiment, the sensor surface 70 is part of the fabric of a sheet. In an embodiment, the sensor surface 70 is part of the fabric of a mattress pad. In an embodiment, sensors are placed on a sheet. In an embodiment, sensors are placed on a mattress pad.

Upper sensor surface 70 can be formed using transmitting antennas and receiving antennas (drive lines and sensing lines) as discussed above. The transmitter antennas and the receiver antennas can be formed in the patterns as discussed above. The upper sensor surface 70 can determine the position of someone on the mattress and their movements on the mattress. The information determined via the sensor surface 70 can be used in order to inform a person about sleep habits or other potential issues arising from the use of the mattress 60. This information may be used by a person in order to select better sheets, blankets, pads or pillows. In an embodiment, measurements taken by the sensors are used to provide information regarding the life-span of the mattress. In an embodiment, measurements taken by the sensors are used to provide recommendations to a consumer. In an embodiment, measurements taken by the sensors are used to provide information about sleep habits.

In an embodiment, the sensor surface 70 is implemented in a hospital setting. In an embodiment, the sensors surface provides information related to occupancy of a hospital bed. In an embodiment, the sensor surface 70 determines biometric data of a patient that is lying in the bed. In an embodiment, the sensor surface 70 provides information about the breathing of a patient. In an embodiment, the sensor surface provides information about the heart rate of a patient. In an embodiment, the patient's position and movements are monitored via the sensor surface 70. In an embodiment, the sensor surface 70 detects the presence of liquids due to the effect such liquids have on the signal that is transmitted.

Signal Infusion

This section relates to touch and in-air sensitive input devices, specifically input devices that sense the human hand on and/or above and/or near, the surface of the object. Within the context of the vehicle components discussed above, signal infusion can be implemented in the control and interaction with the components.

Signal injection (a/k/a signal infusion) can be used to enhance appendage detection and characterization. See, e.g., U.S. Provisional Patent Application No. 62/428,862 filed Dec. 1, 2016, the contents of which are hereby incorporated herein by reference. The three-dimensional position, orientation and "curl" or "flex" of fingers on a hand holding a controller can be measured by infusing signals into the hand or other body parts and measuring the contribution of each of these signals at various points on a controller (e.g., a handheld or hand operated controller) or instrumentation within a vehicle. In an embodiment, infusion signals are measured at a sensor near the hand or as distance between the sensor and the hand changes. In an embodiment, the receiving apparatus can be a capacitive sensor, especially a projected-capacitive sensor that uses simultaneous orthogonal signals.

Figure 19:
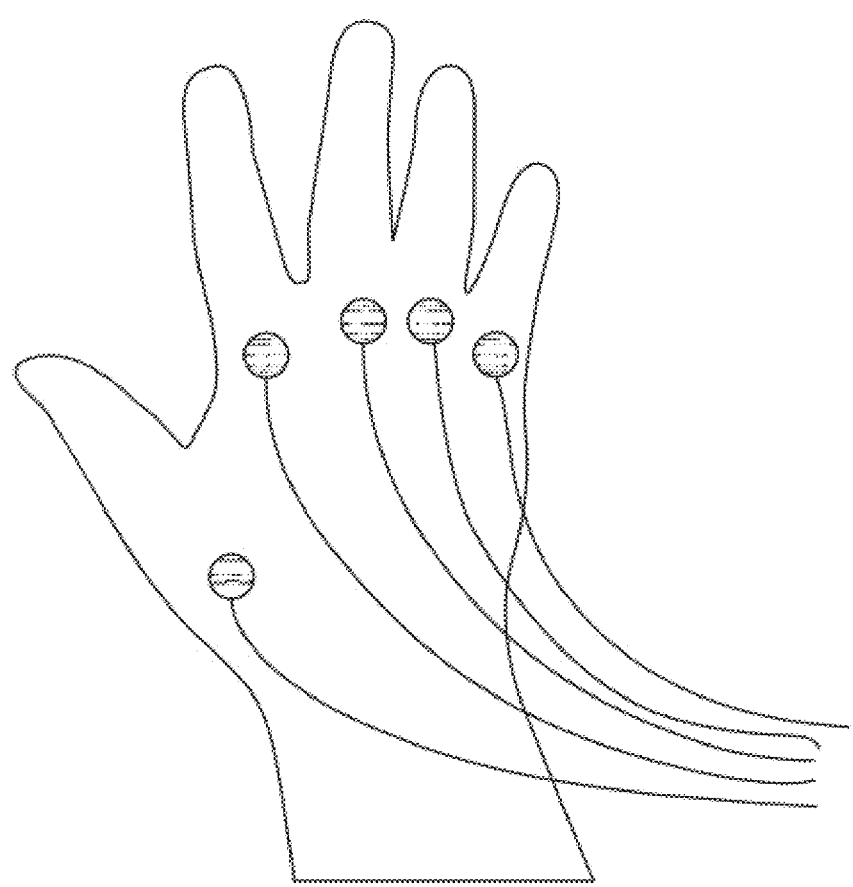
FIG. 19 is a schematic illustration of one embodiment of a signal infusion system for a hand.

Briefly turning to FIG. 19, in an embodiment, signals may be infused into the hand in a manner that the signal levels should be different for each finger due to the different amounts of flesh through which the signals must pass. In an embodiment, each injected signal will be present on each finger, but in different amounts. In an embodiment, to determine the position of each finger, it will be necessary to determine the amounts of each signal to determine where one or more fingers are touching, or where one or more fingers are hovering.

Figure 20:
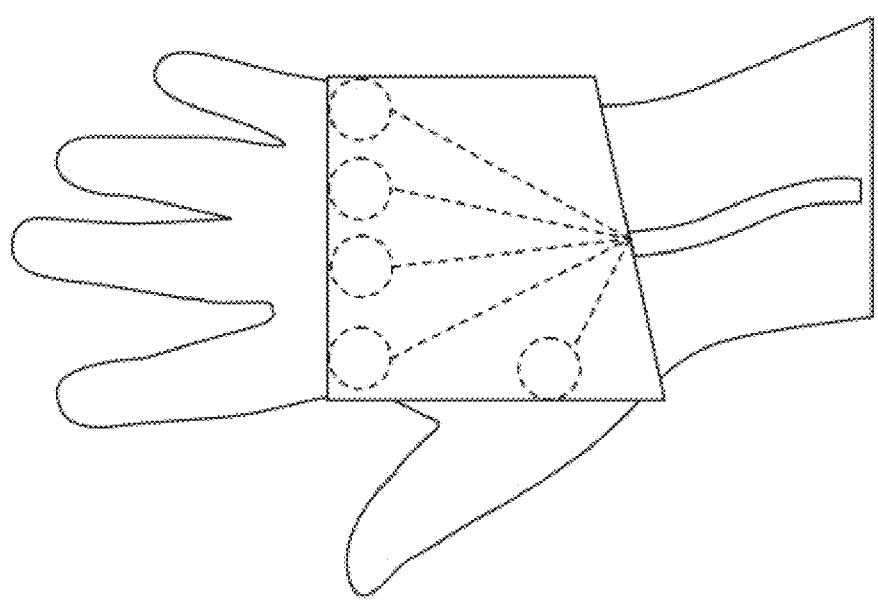
FIG. 20 is a schematic illustration of another embodiment of the signal infusion system shown in FIG. 15.
Figure 21A:
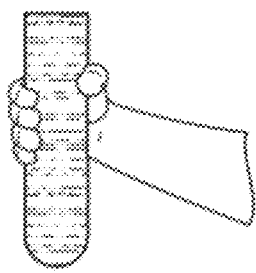
FIGS. 21A-21F is an illustration of a variety of hand poses with respect to an object such as a game controller.
Figure 21B:
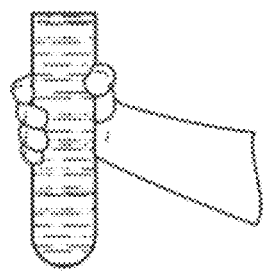
Figure 21C:
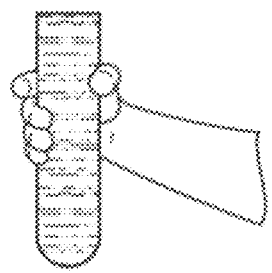
Figure 21D:
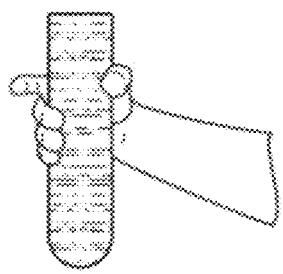
Figure 21E:
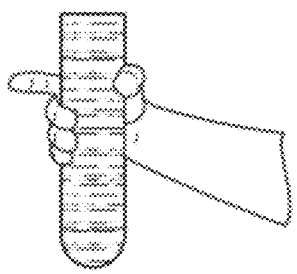
Figure 21F:
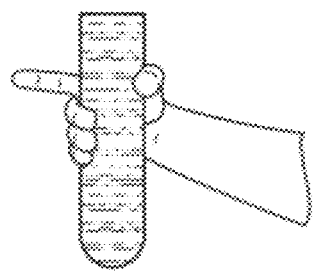

Briefly turning to FIG. 20, there is illustrated the use of a strap, lanyard or glove to inject the signals into the hand. The strap, lanyard or glove may be designed to be form-fit to the hand, or may be elastic. One or more signals are injected (i.e., infused) into the hand by electrodes that are in capacitive or ohmic contact with the hand. The strap, lanyard or glove may infuse the signals near the fingers, or farther away. It may infuse them on the back or front of the hand, or on the surface of some other part of the body. For example, a wrist-strap may be used to infuse signals at that point.

Briefly turning to FIGS. 21A-21F, illustrations of several hand poses are shown about an object to simulate grip on a generic version of a controller for a discussion concerning detecting the position and "curl" of a finger. In an embodiment, the index finger can be used as a trigger for the controller and thus, it may be desirable to determine its placement, how far it extends from the surface of the controller, and the angles of the finger joints. In an embodiment, because most sets of joint angles are unnatural positions (and so unlikely to occur), it may be sufficient to roughly determine position of the finger be able to deduce how the finger is positioned or curled.

Figure 22:
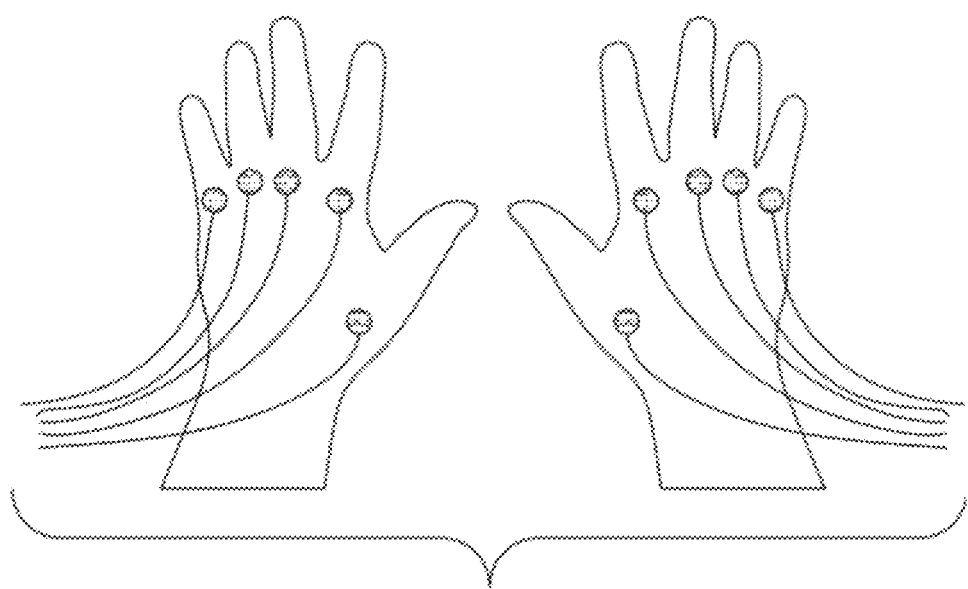
FIG. 22 is a schematic illustration of a bimanual variation of the embodiment of the signal infusion system shown in FIG. 19.

Turning briefly to FIG. 22, a bimanual variation of the embodiment shown in FIG. 19 is shown. Signals are infused into both hands of a user at a variety of locations. In an embodiment, signals from one hand flow through the fingers of the other hand when the hands are in close contact to one another or touching. Contact between fingers of the same hand (e.g. an OK gesture) create a path from one signal injector to another on the same hand, and contact between fingers of both hands (e.g. touching index fingers together) creates a path between signal injectors on both hands. In the case of a multi-user system, contact between the hands of multiple users creates a number of pathways for signals to travel that can be interpreted as command gestures.

With a controller (e.g., a game controller) or other user interface device, it is desirable to be able to detect and characterize the location of the holding hand's fingers, even when they are not actually touching the device. In an embodiment, an index finger can be detected as a "trigger finger", and thus, an input device would sense its position and "curl", including the parts of the finger that are not in contact with a touch-detecting surface.

In an embodiment, a game controller's surface is a touch sensitive surface (e.g., a detector or touch screen) that can detect where on the surface the hand and fingers are touching. In an embodiment, the touch sensitive surface is a capacitive touch screen or other touch surface, and small changes in capacitance are used to detect when conductive or capacitive objects touch or are "hovering" nearby. As used in this context, the hovering means sufficiently close to the touch surface to cause a recognizable change, despite the fact that the conductive or capacitive object, e.g., a finger, is not in actual physical contact with the touch surface.

In an embodiment, an electrical signal is injected (a/k/a infused) into the hand or other part of the body, and this signal (as conducted by the body) can be detected by the capacitive touch detector in proximity to the body, even when the body (e.g., hands, fingers or other part of the body) are not in direct contact with the touch surface. In an embodiment, this detected signal allows a proximity of the hand or finger or other body part to be determined, relative to the touch surface. In an embodiment, this detected signal allows a proximity and orientation of the hand or finger or other body part to be determined, relative to the touch surface.

In an embodiment, the signal infusion described herein is deployed in connection with a capacitive touch detector that uses a plurality of simultaneously generated frequency orthogonal signals to detect touch and hover, including, without limitation, the touch sensitive surfaces illustrated in U.S. Pat. Nos. 9,019,224, 9,158,411 and 9,235,307 (all of which are hereby incorporated herein by reference). In an embodiment, the infused signal is simultaneous with, and frequency orthogonal to, the plurality of simultaneously generated frequency orthogonal signals that are used to detect touch and hover. In an embodiment, each of a plurality of infusion signals are infused into the hand or finger at a location near the proximal knuckle (i.e., where the fingers join the hand). In an embodiment, one signal is infused proximate to a first finger, and another signal is injected proximate to another finger. In an embodiment, a plurality of unique, frequency orthogonal signals (which are both frequency orthogonal with the other infused signals and the signals used by the touch detector) are infused into the hand in a plurality of locations. In an embodiment, five unique, frequency orthogonal signals (which are both frequency orthogonal with the other infused signals and the signals used by the touch detector) are infused into the hand proximate to each finger (as used herein, the thumb being considered a finger).

The sensors—which absent the infused signals are configured to measure and identify changes in the level of the frequency orthogonal signals that are received on receivers of the capacitive touch detector—is also configured to measure and identify changes in the level of the infused frequency orthogonal signals. Identification of the change in the infused frequency orthogonal signals, allows the proximity of the hand (or finger or some other body part) to be determined, relative to the touch surface. Orientation may also be determined from interpretation of the infusion signal as received by the touch sensor receivers.

In an embodiment, more than one electrical signal is infused into and conducted by the body, allowing the relative characteristics of these signals (as received by the sensors) to be used to determine the relative proximity and orientation of the body or body parts to the sensors. As an example, five infusion pads (e.g., electrodes) may be positioned proximate to the five knuckles where the fingers join to the hand, and ten unique, frequency orthogonal signals (frequency orthogonal with the other infused signals and the signals used by the touch detector) are infused into the hand, two via each of the five injector pads. In the example, each of the five injector pads conducts two separate signals to the hand. In an embodiment, each pair of signals are relatively distant frequencies from each other, e.g., one high and one low frequency in each pair, because higher and lower frequency signals have differing conduction characteristics across the body, and therefore differing detection characteristics at the touch sensor.

In an embodiment, the infusion signals are infused through a strap or lanyard that touches (or is in close proximity to) the user's hand, wrist or other body part. In an embodiment, one or more infusion pads or infusion electrodes are integrated into a strap or lanyard associated with the touch object including the touch surface. In an embodiment one or more infusion pads or electrodes are integrated into a wearable garment, e.g., a glove. In an embodiment, one or more infusion pads are integrated into an object in the physical environment, for example, but without limitation, a chair back, seat or arm, a table top, or a floor mat.

In an embodiment, the injected signals from the infusor's device (which may be a strap, lanyard, wearable or provided as an environmental source) are used to determine whether the infusor's device is being worn by or is in proper proximity to the user. In an embodiment, the injected signals from the infusor's device are used to determine whether a controller is being used without the benefit of the infusor's device.

In an embodiment, the "curl" of some or all of the fingers of the hand holding a controller can be determined by analyzing the relative characteristics of the injected signals as they are received by the touch detector. In an embodiment, these characteristics include the relative amplitudes and time offsets or phases of the received signals. In an embodiment, MIMO-like techniques (such as principal components analysis) are used to determine the relative contributions of infused signal received that are contributed by each finger. In an embodiment, a calibration step is performed and subsequent measurements are interpreted given the information in the calibration step. In an embodiment, the calibration step includes moving the fingers to specified positions while the contributions of the infusion signals are measured. In an embodiment, the calibration step includes performing a gesture or set of gestures with the fingers while the contributions of the infusion signals are measured.

In an embodiment, impedances are placed in series with the signal infusors to enhance the ability to distinguish the contributions of the infusion signals from what is received from each finger. In an embodiment, the impedances are resistances. In an embodiment, the impedances are capacitances. In an embodiment, the impedances are inductances. In an embodiment, the impedances are parallel and series combinations of resistors and/or capacitors and/or inductors.

In an embodiment, the impedances are general and include resistance and reactance components that may vary according to frequency. In an embodiment, the impedances in series with the signal infusors have an impedance approximately the same as the impedance that would be experienced by the infused signal if it traversed the amount of human flesh equivalent to the distance between its infusion location and the bases of the other fingers. In an embodiment, signals infused into the fingers are used to sense contact between the fingers themselves. In an embodiment, the signal infusers are paired with signal receivers and the signals received by such signal receivers are used to sense finger-to-finger contact.

In many systems, bimanual input is desirable. In an embodiment, a user holds two controllers, one in each hand. The two controllers are configured to infuse one or more distinct infusion signals into each of the hands of the user as described above. In an embodiment, infused signals from one controller can be sensed by the other controller when the user's hands come into contact with or close proximity to one another. In an embodiment, the pair of controllers and signal injectors are used to sense contact between fingers of different hands.

In many systems, multi-user input is desirable. In an embodiment, two or more users work with independent controllers. In an embodiment, signals infused into the hands of one user can be detected by the controller of another user when intentional (e.g., a handshake, fist-bump, or high-five) or unintentional contact is made between users. In an embodiment, the type of contact between users (e.g., a handshake, fist-bump, high-five or an unintentional or incidental contact) may be distinguished by the signals infused into the hands of one user that are detected by the controller of another user. In an embodiment, signals infused into the hands of one user can be detected by signal receivers that are proximate to signal infusors of another user when contact (intentional or unintentional) is made. In an embodiment, the type of contact between users (e.g., a handshake, fist-bump, high-five or an unintentional or incidental contact) may be distinguished by the signals infused into the hands of one user that are detected by signal receivers that are proximate to signal infusors of another user.

In an embodiment, signals infused into the fingers of a user can be sensed by multiple controllers, but it is not necessary for such controllers to be associated with one or more signal infusors. In other words, as an example embodiment, two users may each use a wearable strap-based signal infusor (which may look like, e.g., a watch), each of the wearable strap-based infusors having their own frequency orthogonal signals—and each user may use one or more of a plurality of touch objects that can detect the frequency orthogonal signals of each of the wearables.

In various embodiments, the controller/user-interface device may be one or more of the following—a handheld controller, a bimanual handheld controller, a VR headset, an AR headset, a keyboard, a mouse, a joystick, ear-phones, a watch, a capacitive touch sensitive mobile phone, a capacitive touch sensitive tablet, a touchpad, including a hover sensitive touchpad (e.g., as described in U.S. patent application Ser. No. 15/224,266), a touch keyboard (e.g., as described in U.S. patent application Ser. No. 15/200,642), or other touch sensitive objects (e.g., as described in U.S. patent application Ser. No. 15/251,859) all of the aforementioned application incorporated herein by reference.

Other body parts and appendages can be measured as well, such as ears, nose, mouth, jaw, feet, toes, elbows, knees, chest, genitals, buttocks, etc. In an embodiment, a plurality of injector or infusor pads or electrodes are distributed among the body, each of the pads or electrodes infusing one or more signals that are unique and frequency orthogonal with respect to the others, and with those used by a sensing device with which interaction is desired or intended.

Isolating Infusion Signals to Different Body Areas

Normally an electrical signal that is infused into a human body travels to other parts of that body with relative ease. For the purpose of considering the propagation of infusion signals, the human body can be modeled as (i.e., thought of) as a plastic bag filled with salt water. The plastic bag can be thought of as representing less-conductive portions of the body, such as the skin, and the salt water representing the more conductive portions, such as blood and muscle tissue. At DC or very low frequencies, the body presents a very high electrical impedance to signals infused on its surface. However, at higher frequencies (e.g., around 10 kHz on up), the impedance starts to diminish because the body's surface acts as a capacitor and the signals can pass through it. Moreover, the "salt water" does not represent a substantial barrier for the signals. Therefore, at higher frequencies, the human body conducts quite well. At even higher frequencies, the "skin" effect takes over and forces electrical currents in the body to flow only near the surface. This increases the electrical impedance as seen by the signals because the amount of area the signals have to pass through (as seen in a cross-section of the conductor) is decreased as the signal frequency increases. The "skin effect" becomes more significant, and thus more important to consider, above about 10 MHz.

The difference in transmission of frequencies can be used to make an effective infusion system having two signal infusors operatively connected to a signal source. In an embodiment, each of the two signal infusors can be adapted for attachment to different parts of the same hand of a user. In an embodiment, the signal source is configured to transmit a one signal to the first signal infusor, and a different signal to the second signal infusor. In an embodiment, the signal to the first infusor may include a first high frequency signal above 20 KHz and a first low frequency signal above 10 KHz. In an embodiment, the first high frequency signal is at least one octave above the first low frequency signal. In an embodiment, the first high frequency signal is at least five octaves above the first low frequency signal. In an embodiment, the first high frequency signal is at least ten octaves above the first low frequency signal. In an embodiment, the signal to the second infusor may include a second high frequency signal above 20 KHz and a second low frequency signal above 10 KHz. In an embodiment, the second high frequency signal is at least one octave above the second low frequency signal. In an embodiment, the second high frequency signal is at least five octaves above the second low frequency signal. In an embodiment, the second high frequency signal is at least ten octaves above the second low frequency signal.

In an embodiment, an infused signal can be isolated to a particular portion of the body (e.g., a single finger). In this context, the term isolated refers to mitigating the signal and/or its effects beyond the portion of the body where it is "isolated." In an embodiment, a conductor (also referred to as an antenna) is placed on (or in) the body and the conductor's electrical potential is set to be an alternating current (AC) ground. In an embodiment, a metal band is placed on the surface of the body, between the two portions it is desired to isolate, and it is set to an AC ground. In an embodiment, a piece of metal foil is wrapped around a finger and set to an AC ground to isolate the finger. In an embodiment, a thin piece of metal foil is wrapped around a finger and set to an AC ground to isolate the finger.

In an embodiment, a common mode choke (or inductor) is placed around the body parts to be isolated from each other. In an embodiment, the common mode choke may be similar to the ferrite bead that is placed on the ends of computer cables to reduce common mode currents. In an embodiment, a common mode choke is a metal ring. In an embodiment, a common mode choke ring is made of iron, or a ferrous alloy (e.g., steel). In an embodiment, a common mode choke ring is made from a ferrite material. In an embodiment, the choke could be a solid ring. In an embodiment, the choke could be made in multiple pieces and the pieces would form a ring when placed around the body part in question. In an embodiment, the choke is placed around a finger.

In an embodiment, where two portions of the body are isolated from each other, a signal infused on one body portion is mitigated on the other. In an embodiment, where two portions of the body are isolated from each other, a different signal may be infused on each of the body portions, and each of the two different signals is mitigated on the other. In an embodiment, the isolation mechanism (e.g., choke) will substantially attenuate the isolated signal as measured on the other body part. In an embodiment, the isolation mechanism will substantially attenuate the signal which is not supposed to be in a particular portion of the body so that only the signal that is intended to be in that portion will be detected. In an embodiment, the isolation mechanism substantially attenuates the signal which is not supposed to be in a particular portion of the body and a receiver is sensitized to the signals so that only the signal that is intended to be in that portion will be detected. In an embodiment, the attenuation is only partial and the different body portions can be identified by analyzing the difference or ratio between the two signals. In an embodiment, multiple portions of the body can be isolation from each other in this manner.

Figure 23:
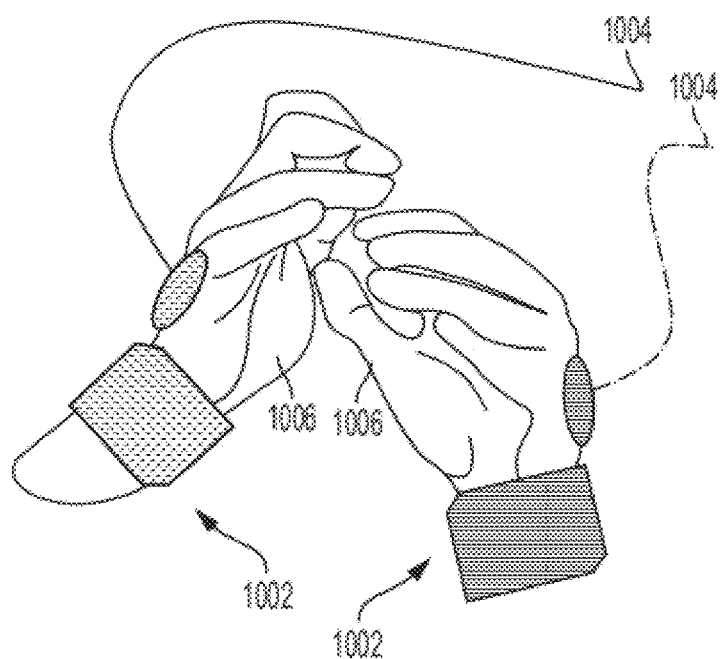
FIG. 23 is an illustration of a hand infusion and isolation system according to one embodiment of the present disclosure.

Turning briefly to FIG. 23, a left and right hand 1006 are shown. Leads and signal infusers 1004 are operatively connected to a signal generator (not shown) and to each of the left and right hands. Different signals are infused into the hands via the infusors. Signals Isolation bands 1002 are placed around the wrists to attenuate propagation of signals infused into the hands beyond the wrist. Thus, signals infused into each hand are isolated from the opposing hand. The differential in magnitude between the two signals on each hand allows a touch or hover receiver to distinguish between the hands on the basis of the quantity of each of the two signals.

In an embodiment, a first signal is infused into the left hand and a second signal is infused into the right hand; an isolator band is placed on each wrist to mitigate propagation of the infused signal beyond the hand in which it is infused. One of the right and left hand come into proximity with a receiver that is part of a sensor that can detect the infused signals (e.g., in a steering wheel as described above). The sensor is used to detect an amount of the first signal and an amount of the second signal in a received signal that is detected after a hand is in proximity to the receiver, and the sensor is configured to differentiate between the first hand and the second hand based on the amount of the first and second signal detected.

Figure 24:
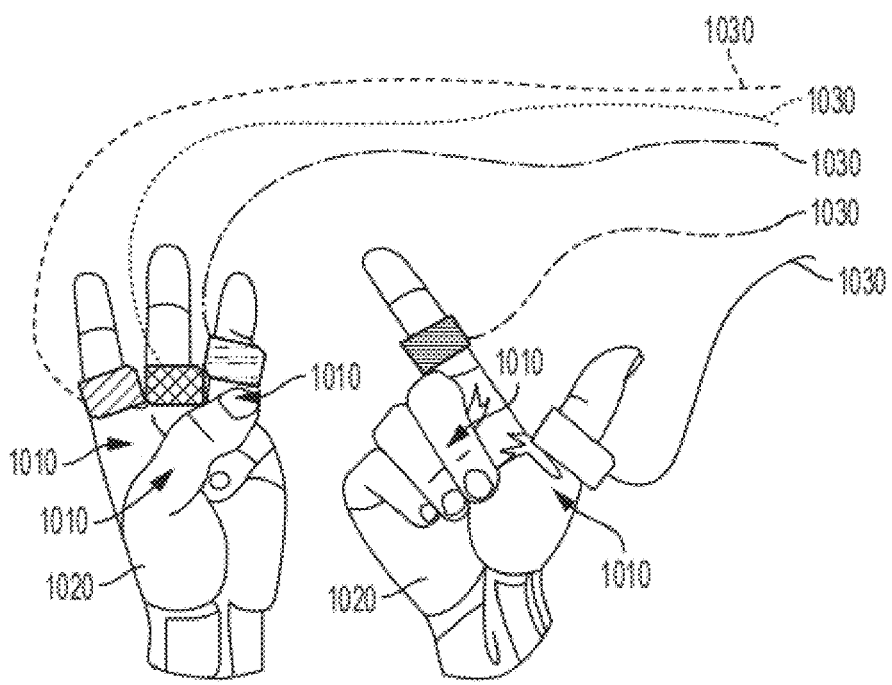
FIG. 24 is an illustration of a finger infusion and isolation system according to one embodiment of the present disclosure.

Turning to FIG. 24, a left and a right hand 1020 are shown. In an embodiment, combination isolators/infusors 1010 are deployed at the base of each of a plurality of fingers and connected to a signal source (not shown) via leads 1030. In an embodiment, isolators/infusors may be embedded in a glove, or one or several rings, or other wearable. The isolators/infusors 1010 at the base of the fingers attenuate the signal infused by that isolator/infusor 1010 from traveling into the hand and thus, the rest of the body. In an embodiment, the isolator/infusor 1010 attenuate the signal infused by that isolator/infusor 1010 from other isolators/infusors 1010 that they may contact. In an embodiment, different orthogonal signals are generated by a signal source and infused into each of the fingers via the isolators/infusors 1010.

In the illustrated embodiment, several fingers are isolated from each other and each infused with a different signal to make it distinguishable from the others. When one of the infused digits comes into proximity with a sensor that detects the infused signals (e.g., a game controller or steering wheel), the sensor can be used to detect an amount of each of the orthogonal signals in a signal received by a sensor receiver. Based on the quantity of each signal received, the sensor can then signal identify the isolator/infusor 1010 associated with the proximate digit.

Signal Types

This form of isolation discussed above is modulation agnostic and thus, should work for almost any signal type. The form of modulation will have little to no effect on the isolation or attenuation caused by the isolators. In an embodiment, the infused signals should be orthogonal to each other to allow a receiver to detect each individual signal from a linear combination of them. Signals that are orthogonal in frequency, code or time should work with this technique.

Note that some forms of isolators will be effective at different frequencies. For example, a choke isolator may more effective at higher frequencies than lower ones. Also for example, a ferrite material will have a frequency window over which it performs well depending on the characteristics of the particular material.

An aspect of the disclosure is a vehicle seat having a sensor. The sensor comprises a first and a second antenna; a signal generation source adapted to generate a signal comprising at least one frequency, the signal generation source being operatively connected to the first antenna; a signal receiver operatively connected to the second antenna, the first antenna and the second antenna being oriented such that: (a) a touch event in proximity thereto causes a change in coupling therebetween, or (b) a change in the position of the first antenna with respect to the second antenna causes a change in coupling therebetween, or (c) a change in a dielectric constant in proximity to at least one of the first antenna or the second antenna causes a change in coupling therebetween, or (d) a change in an electrical conductivity of at least one of the first antenna or the second antenna causes a change in coupling therebetween; a signal processor operatively connected to the signal receiver, the signal processor adapted to periodically make at least one measurement associated with the generated signal; and a detector module configured to use the at least one measurement to determine a use of the seat.

Another aspect of the disclosure is a vehicle seat. The vehicle seat has a sensor comprising a first and a second antenna, the first antenna and the second antenna being oriented such that (a) a touch event in proximity thereto causes a change in coupling therebetween, or (b) a change in the position of the first antenna with respect to the second antenna causes a change in coupling therebetween, or (c) a change in a dielectric constant in proximity to at least one of the first antenna or the second antenna causes a change in coupling therebetween, or (d) a change in an electrical conductivity of at least one of the first antenna or the second antenna causes a change in coupling therebetween; a signal generation source adapted to generate a signal comprising at least one frequency; a signal receiver, a switching apparatus operatively connected to the signal generation source, the signal receiver and the first and second antenna, the switching device configured to electrically connect the signal generation source to one of the first and second antenna, and the signal receiver to the other one of the first and second antenna; a signal processor operatively connected to the signal receiver, the signal processor adapted to periodically make at least one measurement associated with the generated signal; and a detector module configured to use the at least one measurement to determine a use of the seat.

Another aspect of the disclosure is a vehicle seat having a sensor. The vehicle seat has a plurality of antennas; a signal generation source adapted to generate a plurality of unique frequency-orthogonal signals, the signal generation source being operatively connected to at least two of the plurality of antennas and configured to transmit at least one of the plurality of unique frequency-orthogonal signals to each antenna to which it is operatively connected; a signal receiver operatively connected to at least two more of the plurality of antennas other than the at least two of the plurality of antennas, the at least two of the plurality of antennas and the at least two more of the plurality antennas being selected such that a touch event in proximity with respect to one of the at least two of the plurality of antennas and one of the at least two more of the plurality antennas causes a change in coupling therebetween such that; (a) a touch event in proximity thereto causes a change in coupling therebetween, or (b) a change in the position of the at least two of the plurality of antennas with respect to the two more of the plurality of antennas causes a change in coupling therebetween; a signal processor operatively connected to the signal receiver, the signal processor adapted to periodically make at least one measurement associated with each of the generated unique frequency-orthogonal signals; and a detector module configured to use the at least one measurement associated with each of the generated unique frequency-orthogonal signals to determine a use of the seat.

Another aspect of the disclosure is a fabric formed with a sensor. The fabric formed with a sensor comprises a transmitter adapted to transmit a plurality of unique frequency-orthogonal signals; a plurality of transmitting antennas, each of the plurality of transmitting antennas operatively connected to the transmitter, wherein a unique frequency-orthogonal signal is transmitted through each of the plurality of transmitting antennas; a plurality of receiving antennas, each of the plurality of receiving antennas operatively connected to a receiver adapted to receive the plurality of unique frequency-orthogonal signals; and a signal processor adapted to process a measurement of at least one of the plurality of unique frequency orthogonal signals received, wherein the measurement provides meaningful information regarding interaction with the fabric.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

The invention claimed is:

1. A vehicle seat having a sensor, comprising:
a first and a second antenna located within the vehicle seat so that the first antenna is movable with respect to the second antenna;
a signal generation source adapted to generate a signal comprising at least one frequency, the signal generation source being operatively connected to the first antenna;
a signal receiver operatively connected to the second antenna, the first antenna and the second antenna being oriented such that a touch event in proximity thereto causes a change in coupling therebetween;
a signal processor operatively connected to the signal receiver, the signal processor adapted to periodically make at least one measurement associated with the generated signal; and
a detector module configured to use the at least one measurement to determine a use of the seat, wherein the at least one measurement is based on the movement of the first antenna with respect to the second antenna.

2. The vehicle seat of claim 1, wherein the detector module detects a presence or absence of an occupant.

3. The vehicle seat of claim 1, wherein the detector module detects a biometric of an occupant.

4. The vehicle seat of claim 1, wherein the detector module detects a position of an occupant.

5. The vehicle seat of claim 1, wherein the detector module detects a weight of an occupant.

6. The vehicle seat of claim 1, wherein the detector module detects distance of a head from a head rest.

7. The vehicle seat of claim 1, wherein the detector module detects presence of an object.

8. The vehicle seat of claim 1, wherein the detector module runs on the signal processor.

9. A vehicle seat having a sensor, comprising:
a first and a second antenna located within the vehicle seat so that the first antenna is movable with respect to the second antenna;
a signal generation source adapted to generate a signal comprising at least one frequency, the signal generation source being operatively connected to the first antenna;
a signal receiver operatively connected to the second antenna, the first antenna and the second antenna being oriented such that a change in the position of the first antenna with respect to the second antenna causes a change in coupling therebetween;
a signal processor operatively connected to the signal receiver, the signal processor adapted to periodically make at least one measurement associated with the generated signal; and
a detector module configured to use the at least one measurement to determine a use of the seat, wherein the at least one measurement is based on the movement of the first antenna with respect to the second antenna.

10. The vehicle seat of claim 9, wherein the detector module detects a presence or absence of an occupant.

11. The vehicle seat of claim 9, wherein the detector module detects a biometric of an occupant.

12. The vehicle seat of claim 9, wherein the detector module detects a position of an occupant.

13. The vehicle seat of claim 9, wherein the detector module detects a weight of an occupant.

14. The vehicle seat of claim 9, wherein the detector module detects distance of a head from a head rest.

15. The vehicle seat of claim 9, wherein the detector module detects presence of an object.

16. The vehicle seat of claim 9, wherein the detector module runs on the signal processor.

17. A vehicle seat having a sensor, comprising:
a plurality of antennas, wherein at least one of the plurality of antennas is movable with respect to at least one other of the plurality of antennas;
a signal generation source adapted to generate a plurality of unique frequency-orthogonal signals, the signal generation source being operatively connected to at least two of the plurality of antennas and configured to transmit at least one of the plurality of unique frequency-orthogonal signals to each antenna to which it is operatively connected;
a signal receiver operatively connected to at least two more of the plurality of antennas other than the at least two of the plurality of antennas, the at least two more of the antennas and the at least two of the plurality antennas being selected such that a touch event in proximity with respect to one of the at least two of the plurality of antennas and one of the at least two more of the plurality antennas causes a change in coupling therebetween such that;
(a) a touch event in proximity thereto causes a change in coupling therebetween, or
(b) a change in the position of the at least two of the plurality of antennas with respect to the two more of the plurality of antennas causes a change in coupling therebetween;
a signal processor operatively connected to the signal receiver, the signal processor adapted to periodically make at least one measurement associated with each of the generated unique frequency-orthogonal signals; and
a detector module configured to use the at least one measurement associated with each of the generated unique frequency-orthogonal signals to determine a use of the seat, wherein the at least one measurement is based on the movement of the at least one of the plurality of antennas with respect to the at least one other of the plurality of antennas.

18. The vehicle seat of claim 17, wherein the detector module detects a presence or absence of an occupant.

19. The vehicle seat of claim 17, wherein the detector module detects presence of an object.

20. The vehicle seat of claim 17, wherein the detector module runs on the signal processor.

* * * * *